(12) United States Patent
Choi et al.

(10) Patent No.: US 11,496,914 B2
(45) Date of Patent: Nov. 8, 2022

(54) COMBINED DISTRIBUTED RANGING SESSIONS INCLUDING COMMON DEVICES

(71) Applicant: QUALCOMM Incorporated, San Diego, CA (US)

(72) Inventors: Chang-Sik Choi, Seoul (KR); Kapil Gulati, Belle Mead, NJ (US); Junyi Li, Franklin Park, NJ (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/184,403

(22) Filed: Feb. 24, 2021

(65) Prior Publication Data

US 2022/0272549 A1 Aug. 25, 2022

(51) Int. Cl.
*H04W 24/02* (2009.01)
*H04W 8/22* (2009.01)
*H04W 64/00* (2009.01)

(52) U.S. Cl.
CPC ............. *H04W 24/02* (2013.01); *H04W 8/22* (2013.01); *H04W 64/00* (2013.01)

(58) Field of Classification Search
CPC ........ H04W 24/02; H04W 8/22; H04W 64/00
See application file for complete search history.

(56) References Cited

U.S. PATENT DOCUMENTS

| 2015/0029873 | A1 | 1/2015 | Subramanian et al. | |
| 2019/0068639 | A1* | 2/2019 | Alexander | H04W 4/46 |
| 2019/0268726 | A1* | 8/2019 | Jiang | G01S 5/0284 |
| 2020/0128506 | A1* | 4/2020 | Zhang | H04W 4/08 |
| 2020/0336303 | A1 | 10/2020 | Sierra et al. | |
| 2021/0185484 | A1* | 6/2021 | Zhou | H04W 4/021 |

OTHER PUBLICATIONS

International Search Report and Written Opinion—PCT/US2022/011602—ISA/EPO—dated Apr. 21, 2022.
Lindskog E., (Samsung): "Some Passive Ranging Considerations", IEEE Draft, 11-20-0385-02-00AZ-Some-Passive-Ranging-Considerations, IEEE-SA Mentor, Piscataway, NJ USA, vol. 802.11az, No. 2, Apr. 1, 2020 (Apr. 1, 2020), pp. 1-41, XP068167293, Retrieved from the Internet: URL: https://mentor.ieee.org/802.11/dcn/20/11-20-0385-02-00az-some-passive-ranging-considerations.pptx, [retrieved on Apr. 1, 2020], Abstract, Slide 16-17, Slide 21-25.

* cited by examiner

*Primary Examiner* — Jae Y Lee
(74) *Attorney, Agent, or Firm* — Campbell C. Chiang; Procopio, Cory, Hargreaves & Savitch LLP

(57) ABSTRACT

Independent ranging sessions that are initiated by multiple initiating user equipments (UEs) are detected and combined into a single combined ranging session to reduce overhead. The independent ranging sessions may be determined to be nearby and concurrent when a UE detects a number of ranging cycles within a predetermined time. The UE may send messages to each initiator UE indicating that the ranging sessions should be combined and the initiator UEs will terminated initiating any further ranging sessions. Combined ranging session may be initiated by the UE and may include all of the participating UEs from the independent ranging sessions. The combined ranging session continues until it is determined that one or more UEs in the combined ranging session are not receiving ranging signals from other UEs.

55 Claims, 8 Drawing Sheets

400 ⟶

| Visibility Map | UE1 | UE2 | UEA | UEB | UEC |
|---|---|---|---|---|---|
| UE1 | NA | | | | |
| UE2 | | NA | | | |
| UEA | X | X | NA | 0 | X |
| UEB | X | X | 0 | NA | X |
| UEC | X | X | X | X | NA |

402 ⟶ (pointing to UEA row)

FIG. 4

COMBINED DISTRIBUTED RANGING SESSIONS INCLUDING COMMON DEVICES

BACKGROUND

Background Field

The subject matter disclosed herein relates to wireless communications systems, and more particularly to methods and apparatuses for ranging or positioning of user equipment in a distributed wireless communications system.

Relevant Background

Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

A common means to determine the location of a device is to use a satellite positioning system (SPS), such as the well-known Global Positioning Satellite (GPS) system or Global Navigation Satellite System (GNSS), which employ a number of satellites that are in orbit around the Earth. In certain scenarios, however, location determination signals from an SPS may be unreliable or unavailable, e.g., during adverse weather conditions or in areas with poor satellite signal reception such as tunnels or parking complexes. Moreover, position information generated using SPS is prone to imprecision. For example, off-the-shelf GPS positioning devices have an accuracy of a few meters, which is not optimal to ensure safe autonomous driving and navigation.

Coordinated or automated driving requires communications between vehicles, which may be direct or indirect, e.g., via an infrastructure component such as a roadside unit (RSU). For vehicle safety applications, both positioning and ranging are important. For example, vehicle user equipments (UEs) may perform positioning and ranging using sidelink signaling, e.g., broadcasting ranging signals for other vehicle UEs or pedestrian UEs to determine the relative location of the transmitter. An accurate and timely knowledge of the relative locations or ranges to nearby vehicles, enables automated vehicles to safely maneuver and negotiate traffic conditions. Round trip time (RTT), for example, is a technique commonly used for determining a range between transmitters. RTT is a two-way messaging technique in which the time between sending a ranging signal from a first device to receiving an acknowledgement (e.g., in the form of return ranging signal) from a second device (minus processing delays) corresponds to the distance (range) between the two devices.

SUMMARY

Independent ranging sessions that are initiated by multiple initiating user equipments (UEs) are detected and combined into a single combined ranging session to reduce overhead. The independent ranging sessions may be determined to be nearby and concurrent when a UE detects a number of ranging cycles within a predetermined time. The UE may send messages to each initiator UE indicating that the ranging sessions should be combined and the initiator UEs will terminated initiating any further ranging sessions. Combined ranging session may be initiated by the UE and may include all of the participating UEs from the independent ranging sessions. The combined ranging session continues until it is determined that one or more UEs in the combined ranging session are not receiving ranging signals from other UEs.

In one implementation, a method of ranging between user equipments (UEs) performed by a first UE, includes receiving initial messages to initiate separate ranging sessions from a plurality of UEs; sending a message to the plurality of UEs to combine the separate ranging sessions and indicating that the first UE will initiate the combined ranging session; and performing the combined ranging session with the plurality of UEs.

In one implementation, a first user equipment (UE) configured for ranging between UEs, includes a wireless transceiver configured to wirelessly communicate with entities in a wireless network; at least one memory; and at least one processor coupled to the wireless transceiver and the at least one memory, wherein the at least one processor is configured to: receive initial messages to initiate separate ranging sessions from a plurality of UEs; send a message to the plurality of UEs to combine the separate ranging sessions and indicating that the first UE will initiate the combined ranging session; and perform the combined ranging session with the plurality of UEs.

In one implementation, a first user equipment (UE) configured for ranging between UEs, the first UE includes means for receiving initial messages to initiate separate ranging sessions from a plurality of UEs; means for sending a message to the plurality of UEs to combine the separate ranging sessions and indicating that the first UE will initiate the combined ranging session; and means for performing the combined ranging session with the plurality of UEs.

In one implementation, a non-transitory storage medium including program code stored thereon, the program code is operable to configure at least one processor in a first user equipment (UE) for ranging between UEs, the program code comprising instructions to: receive initial messages to initiate separate ranging sessions from a plurality of UEs; send a message to the plurality of UEs to combine the separate ranging sessions and indicating that the first UE will initiate the combined ranging session; and perform the combined ranging session with the plurality of UEs.

In one implementation, a method of ranging between user equipments (UEs) performed by a first UE, includes sending an initial message to a second UE to initiate a first ranging session; receiving a message from the second UE to combine the first ranging session with a second ranging session initiated by a third UE and indicating that the second UE will initiate a combined ranging session; and performing the combined ranging session with the second UE.

In one implementation, a first user equipment (UE) configured for ranging between UEs, includes a wireless transceiver configured to wirelessly communicate with entities in a wireless network; at least one memory; and at least one processor coupled to the wireless transceiver and the at least one memory, wherein the at least one processor is configured to: send an initial message to a second UE to initiate a first ranging session; receive a message from the second UE to combine the first ranging session with a second ranging session initiated by a third UE and indicating that the second UE will initiate a combined ranging session; and perform the combined ranging session with the second UE.

In one implementation, a first user equipment (UE) configured for ranging between UEs, the first UE includes means for sending an initial message to a second UE to initiate a first ranging session; means for receiving a message from the second UE to combine the first ranging session with a second ranging session initiated by a third UE and indicating that the second UE will initiate a combined ranging session; and means for performing the combined ranging session with the second UE.

In one implementation, a non-transitory storage medium including program code stored thereon, the program code is operable to configure at least one processor in a first user equipment (UE) for ranging between UEs, the program code comprising instructions to: send an initial message to a second UE to initiate a first ranging session; receive a message from the second UE to combine the first ranging session with a second ranging session initiated by a third UE and indicating that the second UE will initiate a combined ranging session; and perform the combined ranging session with the second UE.

BRIEF DESCRIPTION OF THE DRAWING

Non-limiting and non-exhaustive aspects are described with reference to the following figures, wherein like reference numerals refer to like parts throughout the various figures unless otherwise specified.

FIG. 4 illustrates a visibility map that may be generated for determining the number of ranging signals that are missed during a combined ranging session.

DETAILED DESCRIPTION

Figure 1:
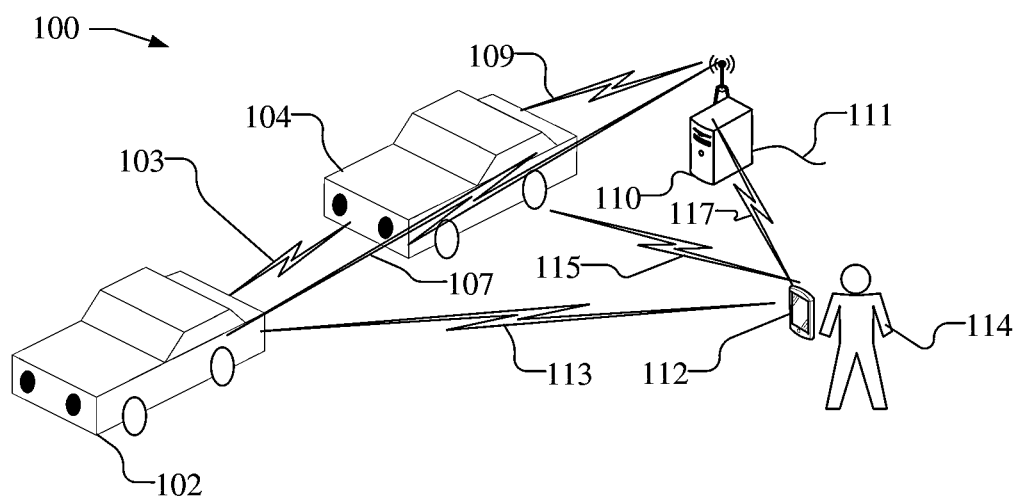
FIG. 1 illustrates a wireless communication system illustrating distributed communications, including ranging signaling to support multiple ranging sessions and/or positioning.

A distributed approach may be used for ranging and positioning of vehicles, roadside units (RSU), and pedestrian and may avoid the need for a centralized base station to coordinate and relay communications. Such communications may be used, for example, for automated driving and vehicle safety applications. Communications used in a distributed approach may be made directly, e.g., between vehicles, or between vehicles and a RSU or pedestrian. These communications may include messages and information elements (IEs) with which a vehicle may provide information necessary for automated driving.

For example, for safe operation of autonomous vehicles, the relative locations or ranges to other vehicles needs to be determined. Various approaches may be used to derive the relative positions between vehicles. For example, relative positions of vehicles may be derived using ranging signaling. Ranging signals are sometimes referred to as physical ranging signals, positioning ranging signals, positioning reference signals, or physical referencing signals, and may be collectively referred to herein as PRS signals. PRS signals, for example, may be broadcast by a user equipment (UE) in a vehicle, sometimes referred to as V-UE, and received by other V-UEs and/or infrastructure, e.g., RSU, or UEs held by a pedestrian, using direct communication systems, such as dedicated short-range communication (DSRC), cellular Vehicle-to-Everything (C-V2X) communication, and even 5G New Radio (NR) communications. PRS signals are used to determine a range to the broadcasting vehicle, e.g., using one way ranging, round-trip-time (RTT) positioning operations, or other standard positioning operations such as time of arrival (TOA), time difference of arrival (TDOA) or observed time difference of arrival (OT-DOA).

In a distributed system, an individual UE is able to range with respect to other UEs that are nearby using messages and positioning signals that are transmitted directly to the other UEs. In an RTT-based ranging session, for example, multiple messages and signals are transmitted and received by each UE. For example, an initial set of pre-ranging signal messages (pre-PRS messages) are transmitted and received to request and accept a ranging session, followed by broadcasting the ranging signals (PRS signals) for measurement, which is followed by a set of post-ranging signal messages (post-PRS messages) that exchange measurement payloads. For RTT-based ranging and positioning, for example, the time of arrival (TOA) and time of departure (TOD) measurements of transmitted and received PRS signals may be provided in the post-PRS messages and used by each UE pair to determine the range between the UEs. The pre-PRS and post-PRS messages may be sent over a licensed spectrum to guarantee reliability, while the PRS signals may be broadcast over an unlicensed spectrum (e.g., to enjoy a larger available bandwidth in e.g., UNI-III spectrum). Ranging sessions in a distributed system, i.e., without infrastructure support to coordinate messaging, may result in multiple ranging sessions occurring simultaneously that may include overlapping sets of participating UEs. Each ranging session may include multiple messages and ranging signals that are exchanged between the participating UEs and each ranging session may include multiple participating UEs. Accordingly, where multiple ranging sessions occur simultaneously, the signaling overhead may become excessively large and may undermine ranging and positioning of the UEs.

The distributed mechanism ensures a minimum overhead, but multiple nearby UEs may initiate separate ranging sessions independently of each other. For example, without overhead communications to control ranging sessions, two UE may separately broadcast their own pre-PRS signals to the same set of responder UEs resulting in two independent ranging sessions that include the same responder UEs and that occur at the same time. The number of messages exchanged in each separate ranging session may be large, particularly if there are a number of responder UEs. Further, some signaling, such as the PRS signals, may be broadcast over an unlicensed spectrum, which may delay transmissions due to listen-before-transmit (LBT) procedures used with the unlicensed spectrum. Accordingly, a significant overhead may be present when there are multiple overlapping ranging sessions. The overhead may undermine ranging and positioning in the sessions, e.g., due to additional delays in receiving signaling.

Accordingly, in an implementation, as discussed herein, independent ranging sessions may be combined to a single ranging session thereby reducing the amount of signaling that must be exchanged between UEs. For example, a responder UE that receives multiple pre-PRS messages from multiple initiator UEs for separate ranging sessions may send a message to the initiator UEs indicating that the separate ranging sessions should be combined, and that the responder UE will initiate the combined ranging session. The responder UE then becomes an initiator UE by sending a pre-PRS message to initiate the combined ranging session. Upon receipt of the message from the responder UE that the ranging sessions will be combined, the original initiator UEs will stop initiating ranging sessions and will become responder UEs for the combined ranging session.

FIG. 1 illustrates a wireless communication system 100 illustrating distributed communications, including ranging signaling to support multiple ranging sessions and/or positioning, as described herein. Wireless communication system 100 illustrates a first vehicle 102 with a first wireless device, e.g., V-UE 102, in wireless communications with another V-UE 104, illustrated as a second vehicle. The V-UE 102 and V-UE104 may comprise, but are not limited to, an on-board unit (OBU), a vehicle or subsystem thereof, or various other communication devices. The V-UEs 102 and 104 function and provide communications on behalf of their associated vehicles and, accordingly, may be sometimes referred to herein simply as vehicles 102 and 104 or UEs 102 and 104. The first UE 102 and second UE 104, for example, may be two vehicles traveling on a road along with other vehicles, not illustrated.

The wireless communication system 100 may use, e.g., Vehicle-to-Everything (V2X) communication standard, in which information is passed between a vehicle and other entities within the wireless communication network. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop autonomous or semi-autonomous driving systems, such as Advanced Driver Assistance System (ADAS), which helps drivers with critical decisions, such as lane changes, speed changes, overtaking speeds, and may be used to assist in parking as discussed herein. Low latency communications are used in V2X and are therefore suitable for precise relative positioning, e.g., using ranging signals, such as one way ranging, RTT, TDOA, etc.

In general, there are two modes of operation for V2X services, as defined in Third Generation Partnership Project (3GPP) TS 23.285. One mode of operation uses direct wireless communications between V2X entities, which may sometimes be referred to as sidelink communication. The other mode of operation uses network based wireless communication between entities. The two modes of operation may be combined, or other modes of operation may be used if desired.

The wireless communication system 100 may operate using direct or indirect wireless communications between the UE 102 and UE 104. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. Thus, as illustrated, UE 102 and UE 104 may directly communicate using with a Vehicle-to-Vehicle (V2V) communication link 103. UE 102 and UE 104 may similarly directly communicate with roadside unit (RSU) 110 via Vehicle-to-Infrastructure (V2I) communication links 107 and 109, respectively. The RSU 110 may include a backhaul connection to a network, illustrated by wired connection 111, but may via a wireless Uu interface to a base station. The RSU 110, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The RSU 110 may be used for ranging with UEs 102, 104, or other UEs, and because the position of the RSU 110 may be known precisely, the RSU 110 may be used as an anchor UE with which a position of the UE 102, 104 or other UEs may be determined. The RSU 110 may sometimes be referred to herein as UE 110. The UEs 102, 104 and UE 110 may communicate with additional entities, such as additional vehicles, RSUs or with a UE 112 held by pedestrian 114 using direct communication links. For example, UE 102 may communicate with UE 112 via V2V communication link 113, UE 104 may communicate with UE 112 via V2V communication link 115, and UE 110 may communicate with UE 112 via V2I communication link 117.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., ADAS or safety use cases.

In other implementations, UE 102 and UE 104 may indirectly communicate with each other, e.g., through the RSU 110 via the V2I communication links 107 and 109, respectively or through other network infrastructure (not shown), e.g., using cellular vehicle-to-everything (CV2X). For example, vehicles may communicate via a base station in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access.

UEs 102 and 104 may initiate and perform ranging/positioning sessions, including sending pre-PRS messages, broadcasting PRS, and sending post-PRS messages on links 103, 107, 109, 113 or 115, with which the range or relative positions between UEs 102 and 104 may be determined. The PRS broadcast by UEs 102 and 104 may be any signal suitable for ranging, e.g., as defined for DSRC or C-V2X. The PRS may be broadcast on licensed or unlicensed spectrum. For example, in some implementations, PRS may be broadcast on one or more Unlicensed National Information Infrastructure (UNIT) radio bands including, for example, one or more of the UNII-1 radio band, the UNII-2A radio band, the UNII-2B radio band, or the UNII-3 radio band. When broadcasting on unlicensed spectrum, listen-before-transmit (LBT) protocols may be employed.

Where UEs 102 and 104 broadcast PRS in a V2V link 103, the range or relative positions between UEs 102 and 104 may be determined directly. Where UE 102 and 104 broadcast PRS in V2I links 107 and 109 or via links 113 and 115, the range or relative positions between UE 102 and UE 110 or UE 112 and between UE 104 and UE 110 or UE 112 may be determined directly.

The direct wireless communications between the UE 102 and 104 and UE 110 and UE 112, do not require any network infrastructure and enable low latency communications, which is advantageous for precise ranging or positioning. Accordingly, such direct wireless communications may be desirable for ranging over short distances, e.g., with nearby vehicles or infrastructure.

The UEs, e.g., any of V-UE 102, V-UE 104, RSU 110, and UE 112, shown in FIG. 1, may be configured to perform ranging and/or positioning operations, such as RTT-based ranging.

Figure 2:
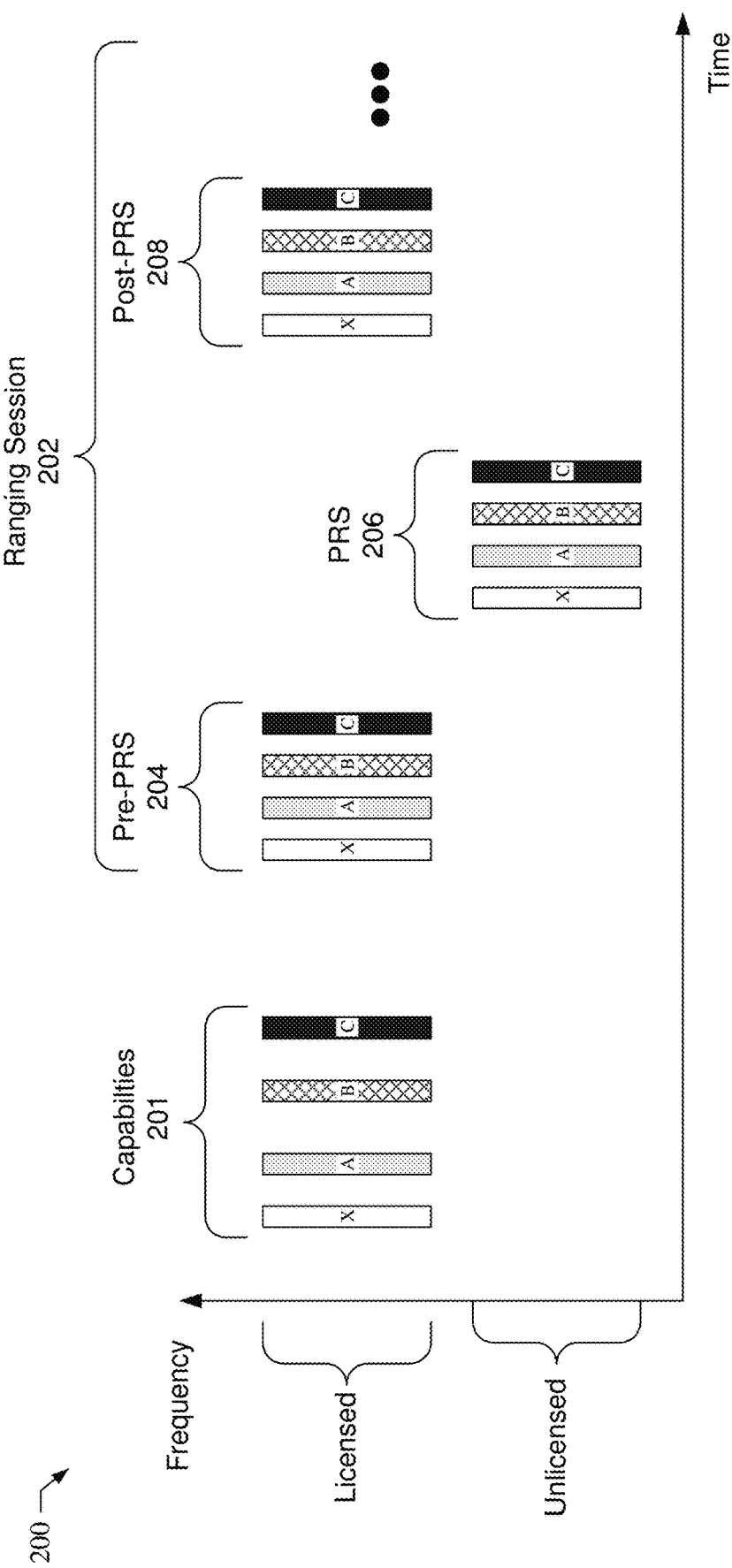
FIG. 2 illustrates a signaling graph indicating the timing and frequencies of various messages that may be sent and received by an initiator UE and three responder UEs for a ranging or positioning session.

FIG. 2 illustrates, by way of example, a signaling graph 200 indicating the timing and frequencies of various messages that may be sent and received by an initiator UE (UEX) and three responder UEs (UEA, UEB, and UEC) for a ranging or positioning session. For example, FIG. 2 illustrates capabilities messages 201 and an RTT-based ranging session 202, during which a number of messages are sent between an initiator UE and responder UEs, including pre-PRS messages 204 to request and accept a ranging session, the PRS signals 208 for measurement, and post-PRS messages 208 to exchange measurement payloads. Each set of pre-PRS 204, PRS 206, and post-PRS208 may be considered a single unit or PRS cycle. Each PRS cycle includes a pre-PRS message 204, PRS signal 206, and post-PRS message 208, and may therefore be referred to herein as a ranging session 202. The ranging sessions (PRS cycles) may be periodic with a period T_r, and the capabilities messages may be periodic with a period T_c, where T_r>T_c. In FIG. 2, the signaling from the initiator UEX is illustrated with white boxes that are labeled "X," signaling from a first responder UEA is illustrated with gray boxes that are labeled an "A," signaling from a second responder UEB is illustrated with hatched boxes that are labeled with a "B," and signaling from a third responder UEC are illustrated with block boxes that are labeled with a "C." The signaling from the initiator UEX is the first box in each of the pre-PRS messages 204, the PRS signals 206, and the post-PRS messages 208, and is followed by the responder UEs (UEA, UEB, and UEC).

As illustrated, the UEs, including the initiator UE and responder UEs, may broadcast capabilities messages 201. The capabilities messages are not part of the ranging session but may include information that may be used by the initiator UE to initiate a ranging session with selected UEs. For example, the capabilities message may be on the ITS spectrum and may include the UE ID, the ranging capability of the UE, the channel that the UE is configured to use, MIMO (Multiple Input Multiple Output) capabilities, etc. The capabilities message may additionally indicate whether the UE needs to determine its position or if its position is known and it may serve as an anchor UE for positioning other UEs. The capabilities message may additionally indicate whether the UE is capable of combining ranging sessions or capable of allowing its initiated ranging session to be combined with another ranging session. It should be understood that while FIG. 2 illustrates the capabilities messages 201 as having the same order as the messages in the ranging session 202, the order may, in fact, differ.

The pre-PRS messages 204 (e.g., pre-ranging messages) are used by the UEs to request and acknowledge a ranging session. As illustrated, the pre-PRS messages 204 may be transmitted on a licensed spectrum to guarantee reliability. The pre-PRS messages 204 may be broadcast or unicast, e.g., with Radio Resource Control (RRC) connections. The initiator UEX broadcasts an initial pre-PRS message 204 (PrePRSRequest) to initiate the ranging session between the initiator UE and the responder UEs and to provide information for the ranging session (illustrated with the white box labeled X). For example, the pre-PRS message 204 from the initiator UE, may include IDs for participating UEs, i.e., the initiator and responder IDs. The pre-PRS request message may include a ranging session ID, the channel for the PRS broadcast by the initiator UEX and responder UEs, the PRS broadcast time, the maximum listen before transmit (LBT) time, etc. The pre-PRS request message from the initiator UEX for example may include a PRS ID that will be used by the initiator UE, and in some implementations, the PRS ID to be used by the responder UEs. If the PRS ID will be fixed over multiple PRS exchanges (e.g., for multiple units in the ranging session 202), the initiator UE may include an ID associated with the current PRS exchange, e.g., a session ID. The initiator UE may determine when the PRS signals 206 will be transmitted, which, for example, may be configured from an upper layer in the initiator UE. The initiator UE may indicate the timing of the PRS by sending the time slot number nears to the desired PRS transmission time. In some implementations, the time slot may be subject to local clock error. The initiator UE may further provide the timing of PRS to be sent by the responder UEs, as well as a maximum LBT time or other maximum predetermined delay for broadcasting the PRS. The initiator UE may further indicate the frequency that will be used to broadcast the PRS signal 206 by the initiator UE and the responder UEs. For example, the frequency of PRS may be selected from an available set of total bandwidths or the frequency of PRS may be selected by sensing the interference and choosing one or more channels whose average interference Reference Signal Receive Power (RSRP) is less than a threshold. The initiator UE may indicate the number of PRS cycles that it will execute during the ranging session 202. The number of PRS cycles may be configured from an upper layer. The pre-PRS message for each PRS cycle, for example, may indicate the current PRS cycle with respect to the total PRS cycles requested, where the number of the current cycle increments after completion of each cycle.

The initial pre-PRS request message from the initiator UE is received and decoded by the responder UEs, which are identified in the initial pre-PRS message. The responder UEs may send pre-PRS messages 204 in response (illustrated with gray, hatched, and black boxes labeled with A, B, C, respectively) which may acknowledge the pre-PRS request message, which may additionally provide information for the ranging session. For example, each responder UE may determine the timing of its PRS signal 208, e.g., based on the PRS timing of the initiator UE plus a delay, which may be based on hardware constraints and the interference level, and the number and order of responder UEs. For example, the delay may be relatively low when the PRS processing time is small and ambient interference is low and may be relatively high when the PRS processing time is high and ambient interference is high. The responder UE may indicate the determined time of its PRS by sending the time slot number nears to the determined PRS transmission time. In some implementations, the time slot may be subject to local clock error. Each responder UE may indicate the PRS ID that it will use or may indicate that it will use the PRS ID that was indicated in the initial pre-PRS message. If the PRS ID will be fixed over multiple PRS exchanges (e.g., multiple PRS cycles in the ranging session 202), the responder UE may include the ID associated with the current PRS exchange, e.g., a session ID, that was received in the initial pre-PRS message from the initiator UE. The responder UEs may broadcast the pre-PRS messages 204, which may be received by the initiator UE (and other responder UEs). In some implementations, each responder UE may transmit the pre-PRS message 204 using unicast with RRC connection to the initiator UE.

The PRS signals 206 are exchanged by the participating UEs. The initiator UE and responder UEs know the expected timing and frequencies of the PRS signals and know the PRS ID (and any session ID used with the exchanged) that is used to broadcast the PRS signals 206. The PRS signals 206 may be, for example, a Quadrature Phase Shift Keying (QPSK) modulated pseudo-noise (PN) sequence and may include the ranging session ID. The PRS signals 206 may be broadcast on an unlicensed spectrum, which may be subject to LBT constraints. In some implementations, when using the unlicensed spectrum, the initiator UEX may reserve the transmission for responder UEs UEA, UEB, and UEC, so that the responder UEs may not need to perform LBT. For example, the initiator UEX broadcasts its PRS signal 206 (white box labeled with X) at the determined time that was indicated in the initial pre-PRS message 204. In some implementations, the initiator UE broadcasts its PRS signal at the determined time plus a random waiting time due to the LBT constraints when the PRS signal is deployed in the unlicensed spectrum. In some implementations, the LBT may be a Category 2 LBT with a fixed window Clear Channel Assessment (CCA) or a Category 4 LBT with a varying window CCA. The initiator UE uses the PRS signal that corresponds to the PRS ID and uses the frequency resources that were indicated in its initial pre-PRS message 204. The initiator UE stores the time instance that the PRS signal is broadcast, and the responder UEs store the time instance that the PRS signal is received. In some implementations, the time instances may be subject to local clock error.

Similar to the initiator UE, each responder UE broadcasts its PRS signal 206 (illustrated with gray, hatched, and black boxes labeled with A, B, C, respectively) at the time and frequencies that were assigned in the initial pre-PRS message 204 by the initiator UE. In some implementations, each responder UE may broadcast its PRS signal at the determined time plus a random waiting time due to the LBT constraints when the PRS signal is deployed in the unlicensed spectrum. In some implementations, the LBT may be a Category 2 LBT with a fixed window CCA or a Category 4 LBT with a varying window CCA. Each responder UE uses the PRS signal that corresponds to the PRS ID that was indicated in its pre-PRS messages 204. Each responder UE stores the time instance that its PRS signal is broadcast, and the initiator UE (and optionally other responder UEs) store the time instance that the PRS signal from each responder UE is received. In some implementations, the time instances may be subject to local clock error.

Thus, each UE records the time of departure (ToD) of its broadcast PRS signal and measures the time of arrival (ToA) of the PRS signal received from the other UEs. The PRS signal may be any signal suitable for ranging, e.g., as defined for DSRC or C-V2X, such as QPSK modulated PN sequence. The ToA and ToD resolution of the PRS signals increase with an increased frequency bandwidth. In some implementations, the angle of departure (AoD) and angle of arrival (AoA) of the broadcast and received PRS signals may also be measured. Broadcasting on an unlicensed spectrum is advantageous as a wider frequency band is available. For example, in some implementations, PRS may be broadcast on one or more UNIT radio bands including, for example, one or more of the UNII-1 radio band, the UNII-2A radio band, the UNII-2B radio band, or the UNII-3 radio band.

The post-PRS messages 208 are sent by each UE to exchange measurement payloads. As illustrated, the post-PRS messages 208 may be transmitted on a licensed spectrum to guarantee reliability. In some implementations, the post-PRS messages 208 may be broadcast or unicast with RRC connection. The initiator UEX sends its post-PRS message 208 (illustrated as the white box labeled with X) and indicates when it broadcast the PRS signal 206 (ToD) and when the PRS signals from the responder UEs were received (ToA). In some implementations, the ToA may be computed as a relative time with respect to the ToD of its broadcast PRS signal, and the relative time may be provided. In some implementations, the relative time may be approximated to the closest multiple of time scale shared by the initiator UE and the responder UEs. In some implementations, the initiator UE may provide an indication of its location in the post-PRS message 208, if known. For example, the location of the initiator UE may be the location at a specific time, such as the broadcast time of its PRS signal or the arrival time of the PRS signal from a responder UE. The post-PRS message 208 may further include the AoD of its PRS signal 206 and the AoA of the PRS signals 206 received from the responder UEs, the orientation of initiator UE, a broadcast indicator of the PRS signal 206, a reception indicator of PRS from the responder UEs, as well as other related measurements, e.g., including map information, the locations of reflectors with respect to the UE, etc.

Similar to the initiator UE, each responder UEs sends its post-PRS signal 208 (illustrated with gray, hatched, and black boxes labeled with A, B, C, respectively) to provide the measurement payloads. Each responder UE may indicate whether it received the PRS signal from the initiator UE and may indicate when it broadcast the PRS signal 206 (ToD) and when the PRS signals from the initial UE (and optionally from other responder UEs) was received (ToA). In some implementations, the ToD may be computed as a relative time with respect to the ToA of the PRS signal from the initiator UE (and optionally with respect to the ToA of the PRS from other responder UEs). In some implementations, the relative time may be approximated to the closest multiple of time scale shared by the initiator UE and the responder UE. In some implementations, the responder UE may provide an indication of its location in the post-PRS message 208, if known. For example, the location of the responder UE provided may be the location at a specific time, such as the arrival time of PRS signal from the initiator UE or the departure time of its broadcast PRS signal. The post-PRS message 208 may further include the AoD of its PRS signal 206 and the AoA of the PRS signals 206 received from the initiator UEX (and optionally received from the other responder UEs), the orientation of initiator UE, a broadcast indicator of the PRS signal 206, a reception indicator of PRS from the responder UEs, as well as other related measurements, e.g., including map information, the locations of reflectors with respect to the UE, etc.

After receiving the post-PRS messages, the initiator UE may compute its range (and in some implementations its location), e.g., using a Kalman filter, and then may transmit the next cycle of pre-PRS messages at a time that is indicated by an upper layer or that is autonomously determined by the initiator UE.

The time between the first pre-PRS message 204 and the last post-PRS message 208 may be the duration of the ranging session and may be, e.g., 100 msec. The duration of each broadcast PRS signals 206 may be, e.g., 47 μsec. In some implementations, multiple PRS cycles, e.g., multiple instances of pre-PRS messages 204, PRS 206, and post-PRS messages 208, may be used together to provide higher accuracy.

Both the initiator UE and the responder UEs may determine the range between itself and each other UE in the ranging session based on the ToD and the ToA of the broadcast PRS signals. For example, the RTT between any pair of UEs (which may be any pair of initiating and responder UEs) may be determined based on the ToD, and ToA, for the PRS, signals (where i=1 for PRS broadcast from a first UE and i=2 for PRS broadcast by a second UE), as the difference between the ToD$_1$ and ToA$_2$ minus the difference between the ToA$_1$ and the ToD$_2$, e.g., as follows.

$$RTT=(ToD_1-ToA_2)-(ToA_1-ToD_2) \qquad \text{eq. 1}$$

The RTT value is the round-trip time for the signal, and thus, the range (distance) between the UE, and UE2 may be determined as RTT/2c, where c is the speed of light.

If the position of one or more responder UEs is known, the range between the initiator UE and the responder UEs may be used along with the known position of the one of the responder UE to determine the position of the other UE, and thus, the ranging session may be a positioning session. The responder UEs with known positions that may be used for positioning may sometimes be referred to herein as anchor UEs. The positions of anchor UEs may be provided to other UEs through messaging, e.g., in the pre-PRS messages or in the post-PRS messages. If the range to multiple anchor UEs is determined, the positions of the multiple anchor UEs may be used in multilateration to determine the position of the initiator UE (or other responder UEs).

The angle measurements, e.g., AoD, and AoA, may be used, e.g., for assistance in positioning. By way of example, based on the range between two UEs and a measured AoA, the relative positions of the two UEs may be determined. With the relative positions of the UEs determined, if the actual position of one of the UEs is known (which may be provided, e.g., in the pre-PRS messages 204 or post-PRS messages 208), the actual position of the other UE may be determined. If the position of two UEs are known by a third UE, the ranges between the third UE and each of the other two UEs will produce two possible positions for the third UE, which may be resolved based on AoD/AoA information. The AoD may be useful if the resolution of the AoA is poor or incorrect, for example. AoD may be measured, e.g., based on a known orientation of the UE (for example, determined by a magnetometer), and the direction of the transmitted signal relative to the UE (e.g., relative to an antenna array of the UE used for beamforming). The AoA may be measured based on the phase difference of a received signal at different antenna elements of an antenna array and the known orientation of the UE, for example determined by a magnetometer). Additionally, geographic constraints may be used to assist in positioning, for example, by constraining possible positions of a vehicle based on positions that are accessible to a vehicle, such as a road.

As discussed above, due to the distributed mechanism for ranging, it is possible that multiple UEs may initiate independent ranging sessions that include at least some of the same responder UEs at approximately the same time. For example, two initiating UEs may separately broadcast their own pre-PRS signals to the same set of responder UEs resulting in two independent ranging sessions that include the same responder UEs and that occur at the same time.

Figure 3A:
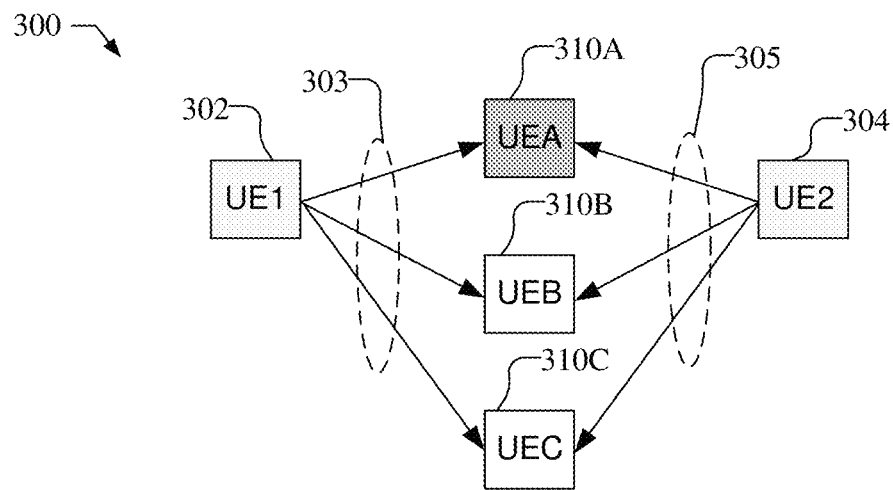
FIG. 3A illustrates a system that includes number of UEs participating in two independent ranging sessions that are separately initiated.

FIG. 3A, by way of example, illustrates a system 300 that includes number of UEs participating in two independent ranging sessions that are separately initiated by UE1 302 and UE2 304, which may be pedestrian UEs, vehicle UEs, etc. The initiator UE1 302 and initiator UE2 304, for example, may not be able to detect each other, e.g., due to distances, and may each initiate ranging sessions by sending pre-PRS messages (illustrated by arrows 303 and 305, respectively) to the responder UEs including UEA 310A, UEB 310B, and UEC 310C, sometimes collectively referred to as UEs 310, which may be RSUs, pedestrian UEs, vehicle UEs, etc. The pre-PRS messages 303 and 305 may be broadcast or unicast messages.

Two concurrent ranging sessions, which include the same set of responder UEs, as illustrated in FIG. 3A, will result in a significant overhead. For example, each PRS cycle in the ranging session initiated by UE1 302 will include a UE1 pre-PRS message, UEA/UEB/UEC pre-PRS messages, UE1 PRS signal, UEA/UEB/UEC PRS signals, UE1 post-PRS message, and UEA/UEB/UEC post-PRS messages, while the each PRS cycle in the other ranging session initiated by UE2 304 will include a UE2 pre-PRS message, UEA/UEB/UEC pre-PRS messages, UE2 PRS signal, UEA/UEB/UEC PRS signals, UE2 post-PRS message, and UEA/UEB/UEC post-PRS messages. The resulting large signaling overhead will undermine ranging and positioning of the initiator UEs UE1 and UE2 because, for example, the PRS signals are constrained by LBT procedures.

Accordingly, it is desirable to combine the two ranging sessions, e.g., by changing the initiator UEs, e.g., from two initiator UEs (UE1 302 and UE2 304) to a single initiator UE, e.g., UEA 310A.

Figure 3B:
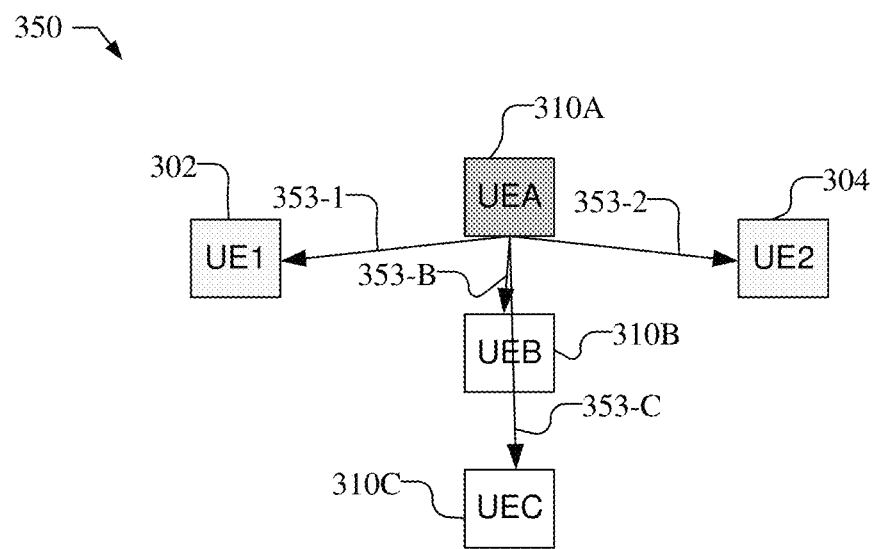
FIG. 3B is similar to FIG. 3A but illustrates the system in which independent ranging sessions are combined into a single combined ranging session.

FIG. 3B, by way of example, illustrates a system 350 in which independent ranging sessions such as shown in FIG. 3A are combined into a single ranging session. The system 350 is similar to system 300 shown in FIG. 3B with like designated elements being the same.

In FIG. 3B, after confirming the existence of multiple nearby ranging sessions, e.g., the ranging sessions initiated by UE1 302 and UE2 304 in FIG. 3A, the UEA 310A may combine the two ranging sessions into a single ranging session that includes both initiator UEs, e.g., UE1 302 and UE2 304 and the responder UEs 310. As illustrated in FIG. 3B, the UEA 310A, which was a responder UE in both ranging sessions initiated by UE1 302 and UE2 304 in FIG. 3A may serve as the initiator UE for the combined ranging session in FIG. 3B. The responder UE (e.g., UEA 310A) may initiate a new combined ranging session that includes the participants from the separate ranging sessions (shown in FIG. 3A). For example, as illustrated in FIG. 3B, for example, the UEA 310A may send pre-PRS messages (illustrated by arrows 353-1, 353-3, 353-B, 353-C (sometimes collectively referred to as pre-PRS messages 353)) to the responder UEs for the new combined ranging session, e.g., the UE1 302, UE2 304, UEB 310B, and UEC 310C. The pre-PRS messages 353 may be broadcast or unicast messages.

The combined ranging session may then proceed with the UEA-310A serving as the initiator UE and UE1 302, UE2 304, UEB 310B, and UEC 310C serving as responder UEs. The combined ranging session may include the pre-PRS messages, the PRS signals, and post-PRS messages, as discussed above. The post-PRS messages in the combined ranging sessions is broadcast so that the original initiator UEs (UE1 302 and UE2 304) receive PRS measurement information from each responder UE to determine their ranges to the other new initiator UE (UEA-310A) and other responder UEs UEB 310B, and UEC 310C, and in some implementations their positions, while serving as responder UEs in the combined ranging session.

The initiator UE for the combined ranging session (e.g., UEA 310A) may continue to initiate combined ranging sessions for a predetermined time or until participants in the combined ranging session are no longer visible to other participants. For example, in the combined ranging session, the PRS signals from each participant (e.g., from initiator UEA-310A and responder UE1 302, UE2 304, UEB 310B, and UEC 310C) should be visible to each of the other. Once the PRS signals from participants in the combined ranging session are not visible to other group members, e.g., more than N times, the combined ranging sessions may end and the original initiator UEs 302 and 304 may begin initiating separate ranging sessions again. For example, the initiator UEA 310A for the combined ranging sessions may send a message (e.g., a V2X message) to the original initiator UEs 302 and 304 indicating that the combined ranging session should be separated, and UEA 310A will stop initiating new combined ranging sessions and the original initiator UEs 302 and 304 can begin initiating separate ranging sessions with appropriate responder UEs, which may be a different set of responder UEs than included in the combined ranging sessions.

For example, in one implementation, the initiator UE for the combined ranging session (e.g., UEA 310A) may monitor which PRS signals from other participants are visible (or missed) in each combined ranging session. FIG. 4, by way of example, illustrates a visibility map 400 that may be generated for determining the number of PRS signals that are missed during each combined ranging session. As illustrated, each participating UE in the combined ranging session may be included in the visibility map 400, but in some implementations, only the original initiator UEs, e.g., UE1 and UE2, and the initiator UEA may be considered. Along each row, the visibility map 400 shows whether a UE receives the PRS signal from another participating UE. For example, in row 402, initiator UEA 310A is illustrated as receiving PRS signals from UE1, UE2, and UEC, but not from UEB. Ideally, the visibility of PRS signals is symmetric, i.e., if the PRS signal from UEB 310B is visible to UEA 310A, then the PRS signal from UEA 310A should be visible to UEB 310B.

The initiator UEA 310A may monitor multiple instances of combined ranging sessions and if the number missed PRS signals from other participants in the combined ranging session exceeds a predetermined threshold N, the combined ranging session may be separated. In some implementations, the threshold N may be used for all combined ranging sessions or the threshold N may be used for a discreet number of previous combined ranging sessions, e.g., N out of the last 10 combined ranging sessions. In some implementations, the initiator UEA 310A may additionally or alternatively monitor the post-PRS messages from each responder UE to determine the number of PRS signals that each responder UE has missed and may separate the combined ranging session if more than a threshold number of PRS signals are missed by the responder UEs. In particular, the initiator UEA 310A may consider the number of PRS signals missed by the original initiator UEs, e.g., UE1 and UE2, whereas the number of PRS signals missed by other responder UEs, e.g., UEB and UEC, may not be pertinent to whether the combined ranging session should be separated. In another implementation, each responder UE, particularly the original initiator UEs, e.g., UE1 and UE2, may separately monitor the number of PRS signals that it has missed and may send a message to the initiator UEA 310A indicating when more than a threshold number of PRS signals have been missed. It should be noted that the PRS signals from the original initiator UEs 302 and 304 may not be visible to each other and, thus, it may not be desirable to consider missed PRS signals between the original initiator UEs when determining whether a threshold number of PRS signals have been missed.

The initiator UEA 310A may determine whether other participating UEs and particularly the original initiator UEs, e.g., UE1 and UE2, received PRS signals from other UEs based on their post-PRS messages or other messages provided by the other UEs. Multiple visibility maps may be combined to determine if the total number of PRS signals for all combined ranging sessions (or a discreet number of previous combined ranging sessions) is greater than a threshold. The initiator UEA 310A, for example, may monitor only the number of PRS signals missed by itself or the number of PRS signals missed by a combination of participating UEs, e.g., the original initiator UEs, e.g., UE1 and UE2initiator UE. In some implementations, the initiator UEA 310A may considered only the PRS signals missed by the original initiator UE1 and UE2.

Figure 5:
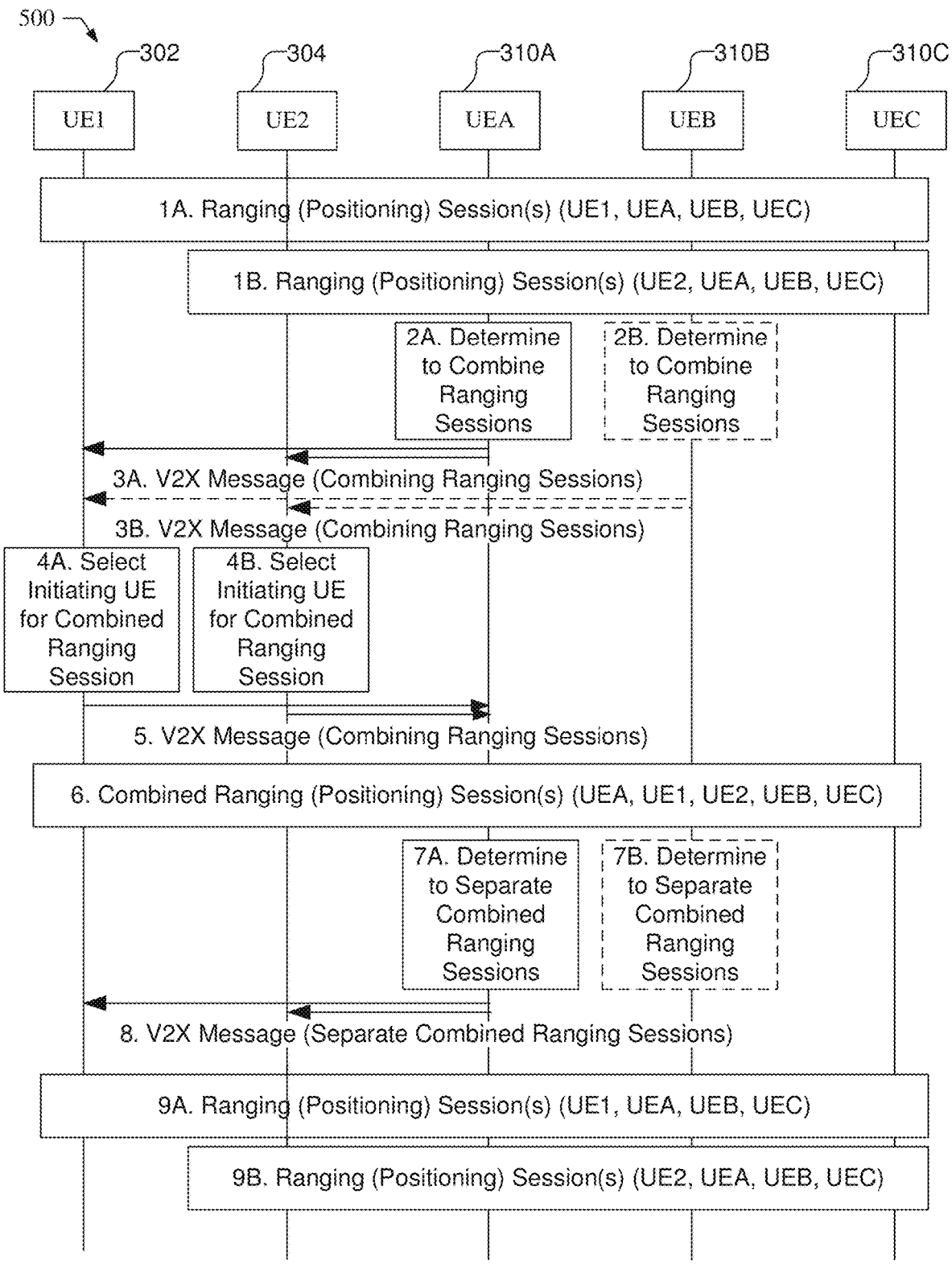
FIG. 5 illustrates a signaling flow for combining independent ranging sessions into a single ranging session.

FIG. 5 illustrates an example of a signaling flow 500 for combining independent ranging sessions into a single combined ranging session. The UE entities 302, 304, 310A, 310B, and 310C, for example, may be V-UEs, RSU, and/or pedestrian UEs, such as UE 102, 104, 110, or 112 shown in FIG. 1 and discussed in FIGS. 3A and 3B and FIG. 4. The original initiator UEs may be UE1 302 and UE2 304 and original responder UEs may be UEA 310A, UEB 310B, and UEC 310C. It should be understood that additional (or fewer) responder UEs may be present, which would involve additional (or fewer) communications that are similar to that shown in FIG. 5. As illustrated, the communications between the UEs in FIG. 6 may be direct communications between the entities and may not involve infrastructure devices, such as base stations, to forward the messages between the entities. It should be further understood that FIG. 5 illustrates the signaling for combining independent ranging sessions that and that additional or other communications may be transmitted between one or more of the UEs shown in FIG. 5 in broadcast, unicast, multicast, or other sidelink signaling or through one or more infrastructure devices, such as RSU 110 or base stations.

At stage 1A, one or more ranging and/or positioning sessions are performed with UE1 302 serving as the initiator UE and UEA 310A, UEB310B and UEC 310C serving as responder UEs. The participating UEs in the ranging session of stage 1A may be identified/selected based on capabilities messages, e.g., messages 201 shown in FIG. 2, in which the UEs provide their identities, ranging capabilities, configured channels, etc. The capabilities messages from responder UEs, e.g., UEA 310A, UEB310B and UEC 310C, may further indicate whether the UE is capable of combining ranging sessions, while the capability message from initiator UE1 302 may indicate whether its initiated ranging session may be combined with another ranging session. The ranging session(s) of stage 1A may not include UE2 304. As discussed, e.g., in FIG. 2, each ranging session, for example, may include an initial pre-ranging message (such as a pre-PRS message) from the initiator UE and responding pre-ranging messages (such as pre-PRS messages) from the responder UEs. Each ranging session may further include ranging signals (PRS signals) from the initiator UE and the responding UEs, and post-ranging signals (post-PRS messages) from the initiator UE and the responding UEs that carry measurement information for the ranging signals, as discussed in FIG. 2. The initiator UE may determine a range to each responder UE using the measurement information.

The responder UEs may similarly determine ranges or timing information to the initiator UE and other responder UEs, which may be used for clock synchronization. The post-ranging messages from anchor UEs may include location information with which the position of UEs may be determined based on the location information and determined ranges to the anchor UEs.

At stage 1B, similar to stage 1A, one or more ranging and/or positioning sessions are performed with UE2 304 serving as the initiator UE and UEA 310A, UEB310B and UEC 310C serving as responder UEs. The participating UEs in the ranging session of stage 1B may be identified/selected based on capabilities messages, e.g., messages 201 shown in FIG. 2, in which the UEs provide their identities, ranging capabilities, configured channels, etc. The capabilities messages from responder UEs, e.g., UEA 310A, UEB310B and UEC 310C, may further indicate whether the UE is capable of combining ranging sessions, while the capability message from initiator UE2 304 may indicate whether its initiated ranging session may be combined with another ranging session. The ranging session(s) of stage 1B may not include UE1 302. The ranging and/or positioning sessions initiated by UE2 304 may be nearby and concurrent with the ranging and/or positioning sessions of stage 1A.

At stage 2A, the UEA 310A determines to combine concurrent ranging sessions initiated by UEs 302 and 304. The UEA 310A, for example, may determine whether to combine concurrent ranging sessions if the capabilities messages (e.g., at messages 201 in FIG. 2) from initiator UE1 302 and UE2 304 indicate that ranging sessions initiated by them may be combined with other ranging sessions. For example, UEA 310A may confirm the existence of multiple concurrent ranging sessions by receiving pre-PRS messages from initiator UEs 302 and 304 in the ranging sessions in stage 1A and stage 1B. The UEA 310A may confirm the existence of multiple independent ranging sessions based on the pre-PRS messages in each ranging session, for example, which may list all participating UEs (including initiator UEs 302 and 304, respectively, and responder UEs 310). In some implementations, e.g., where the pre-PRS messages 303 and 305 are unicast, the UEA 310A may confirm the existence of multiple nearby ranging sessions by sensing a number of PRS cycles in both ranging sessions in stage 1A and stage 1B within a time period. For example, the UEA 310A may sense whether the number of PRS signals received from initiator UEs 302 and 304 is more than a predetermined number (X) within a time period, e.g., each second (X may be any value between 0 and 10 given that PRS periodicity is 100 msec; 100 msec=1 sec/10 PRS). In some implementations, the UEA 310A may sense the number of pre-PRS messages and/or post-PRS messages received from initiator UEs 302 and 304 in ranging sessions in stage 1A and stage 1B within a time period. The post-PRS messages, for example, may include the time of departure (ToD) of the broadcast PRS signals and may be used to assist in determining the number of PRS cycles from each initiator UE. In some embodiments, the UEA 310A may further sense the number of PRS broadcast from responding UEs, e.g., UEB 310B and UEC 310C within the time period. If the UEA 310A senses a number of PRS cycles from multiple ranging sessions within the time period, the UEA 310A may determine that the independent ranging sessions from stages 1A and 1B are concurrent and should be combined.

At stage 2B, one or more other responder UEs, illustrated as UEB 310B may also determine that the ranging sessions from stages 1A and 1B are to be combined as described in stage 2A.

At stage 3A, the UEA 310A may send a combine message (e.g., a V2X message) to each of the initiator UEs 302 and 304 indicating that the ranging sessions will be combined. The UEA 310A may indicate whether it can serve as a positioning anchor (i.e., the location of UEA 310A is precisely known) for positioning of the UEs 302 and 304. The UEA 310A may further measure one or more power characteristics of the PRS signals broadcast by each of the initiator UEs 302 and 304 during the ranging sessions in stages 1A and 1B and may provide an indication of a power characteristic of the PRS signals from the initiator UEs 302 and 304 in the combine message in stage 3A. For example, the UEA 310A may measure the RSRP of PRS signals from both UE1 302 and UE2 304 and determine an average of the RSPR of the PRS signals. The UEA 310A may include the average RSRP of the PRS signals from UE1 302 and UE2 304 in the combine message.

At stage 3B, if the UEB 310B determined to combine the ranging sessions in stage 2B, the UEB 310B may also send a combine message (e.g., a V2X message) to each of the initiator UEs 302 and 304 indicating that the ranging sessions will be combined and may provide an indication of whether UEB 310B may serve as a positioning anchor and an indication of a measured power characteristic of the PRS signals, such as average RSRP of the PRS signals from UE1 302 and UE2 304 measured by UEB 310B.

At stages 4A and 4B, the initiator UE1 302 and initiator UE 304, respectively, may select an initiator UE for the combined ranging sessions and stop initiating independent ranging sessions. Thus, upon reception of the message from the UEA 310A to combine the ranging sessions, the two initiator UEs, e.g., UE1 302 and UE2 304, stop initiating new ranging sessions, i.e., any subsequent initiation of ranging sessions by the two initiator UEs, e.g., UE1 302 and UE2 304, is suspended. The initiator UEs 302 and 304 wait to become responder UEs in a combined ranging session and select the initiator UE for the combined ranging session. For example, if only one responder UE (e.g., UEA 310A) sends a combine message, the UEs 302 and 304 may select the sole responder UE. If the initiator UEs 302 and 304 receive combine messages from more than one responder UE indicating that their ranging sessions will be combined, e.g., in stages 3A and 3B, then the initiator UEs 302 and 304 may determine which responder UE will serve as the new initiator UE in the combined ranging session based on criteria such as the anchor status and power characteristics provided in the combine messages from each responder UE. For example, a responder UE with an ability to serve as an anchor point for positioning may be given priority over a responder UE that cannot serve as an anchor point, and/or a responder UE with a high average RSRP may be given priority over a responder UE with a low average RSRP. In some implementations, for example, the initiator UEs 302 and 304 may determine which responder UE will be the new initiator UE based on a combination of criteria, which may be ordered, such as: anchor with high average RSRP before anchor with low average RSRP before non-anchor with high average RSRP before non-anchor with low average RSRP. Other criteria, combinations of criteria, or orders may be used if desired.

At stage 5, each initiator UE 302 and 304 provide a responding combine message (e.g., a V2X message) to the selected responder UE (e.g., UEA 310A in FIG. 5) indicating that it will be a responder UE and provide an indication that the responder UE is to initiate the combined ranging session. A responder UE that sent a combine message to the initiator UEs 302 and 304 may initiate the combined ranging or positioning sessions if it receives a responding message from the initiator UEs 302 and 304.

At stage 6, UEA 310A initiates one or more combined ranging or positioning sessions that includes the original initiator UEs, i.e., UE1 302 and UE2 304, as responder UEs along with UEB 310B and UEC 310C. The combined ranging session(s) may be similar to the independent ranging sessions of stages 1A and 1B, but with UEA 310A initiating the ranging sessions and the previously initiator UEs (UE1 302 and UE2 304) serving as responder UEs. As discussed in, e.g., in FIG. 2, each ranging session, for example, may include an initial pre-ranging message (such as a pre-PRS message) from the initiator UE and responding pre-ranging messages (such as pre-PRS messages) from the responder UEs. Each ranging session may further include ranging signals (PRS signals) from the initiator UE and the responding UEs, and post-ranging signals (post-PRS messages) from the initiator UE and the responding UEs that carry measurement information for the ranging signals, as discussed in FIG. 2. The post-ranging messages from anchor UEs may include location information with which the position of UEs may be determined based on the location information and determined ranges to the anchor UEs. The post-PRS messages in the combined ranging sessions is broadcast so that the previously initiator UEs (UE1 302 and UE2 304) receive PRS measurement information from each responder UE to determine their ranges to the other new initiator UE (UEA-310A) and other responder UEs UEB 310B, and UEC 310C, and in some implementations their positions, while serving as responder UEs in the combined ranging session(s), as discussed above. The UEA 310A, UEB 310B, and UEC 310C may similarly determine ranges to participating UEs or timing information, which may be used for clock synchronization.

At stage 7A, the initiator UEA 310A may determine whether to separate the combined ranging sessions of stage 6. In some implementations, illustrated by optional stage 7B, other UEs may determine whether to separate the combined ranging sessions of stage 6. It should be understood that while FIG. 5 illustrates stages 7A and 7B as being performed after stage 6, stages 7A and 7B in fact would be performed at the same time as the combined ranging sessions of stage 6. In stage 7A, for example, the initiator UEA 310A for the combined ranging sessions may continue to initiate combined ranging sessions for a predetermined time or until participants in the combined ranging session are no longer visible to other participants. For example, the initiator UEA 310A, for example, may monitor which PRS signals from other participants that are visible (or missed) in each combined ranging session, as discussed above in reference to FIG. 4. The initiator UEA 310A may monitor multiple combined ranging session and if the number PRS signals from other participants in the combined ranging session exceeds a predetermined threshold N, the combined ranging session may be separated. In some implementations, the threshold N may be used for all combined ranging sessions or the threshold N may be used for a discreet number of previous combined ranging sessions, e.g., N out of the last 10 combined ranging sessions. In some implementations, the initiator UEA 310A may additionally or alternatively monitor the post-PRS messages from each responder UE to determine the number of PRS signals that each responder UE has missed and may separate the combined ranging session if more than a threshold number of PRS signals are missed by the responder UEs. In another implementation, each responder UE may separately monitor the number of PRS signals that it has missed (e.g., as illustrated by stage 7B) and may send a message to the initiator UEA 310A indicating when more than a threshold number of PRS signals have been missed. The initiator UEA 310A may determine whether other participating UEs received PRS signals based on their post-PRS messages or other messages provided by the other UEs. The initiator UEA 310A, for example, may monitor only the number of PRS signals missed by itself or the number of PRS signals missed by a combination of participating UEs (which may include or exclude the original initiator UE1 and UE2. In some implementations, the initiator UEA 310A may considered only the PRS signals missed by the original initiator UE1 and UE2.

At stage 8, once the UEA 310A determines that the combined ranging sessions should be separated, the UEA 310A sends a separate message (e.g., a V2X message) to the original initiator UEs 302 and 304 indicating that the combined ranging session should be separated and stops initiating the combined ranging session.

At stages 9A and 9B, the original initiator UEs 302 and 304 begin initiating separate ranging sessions with appropriate responder UEs, which may be the same or a different set of responder UEs than included in the combined ranging sessions.

Thus, the decision of merging and separating ranging sessions may be performed autonomously and executed without the assistance of a centralized network. Multiple nearby ranging sessions may be combined to reduce the signaling overhead and may result in increased accuracy of the ranging between inter-group UEs and may be separated when the benefits of the combined ranging session decrease or are lost.

Figure 6:
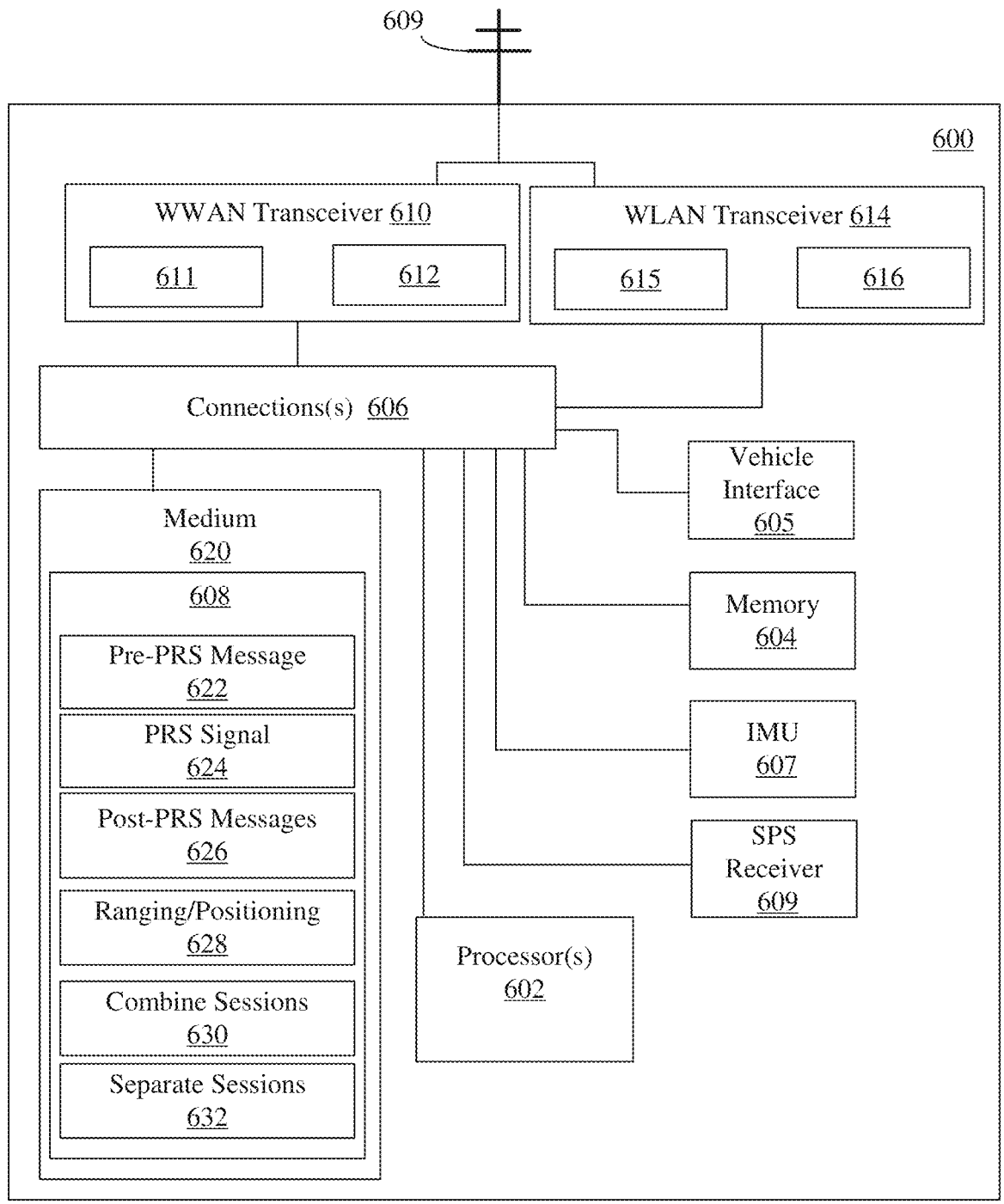
FIG. 6 shows a schematic block diagram illustrating certain exemplary features of a UE configured for combining independent ranging sessions into a single ranging session.

FIG. 6 shows a schematic block diagram illustrating certain exemplary features of a user equipment (UE) 600, which may be UE in vehicles 102 or 104, an RSU 110, or UE 112 held by a pedestrian 114, as illustrated in FIG. 1, or any UE illustrated in FIGS. 3A, 3B, 4, or 5. The UE 600 may be configured to act as a responder UE, e.g., responder UEA 310A, or as an initiator UE, e.g., initiator UE1 302, where multiple independent and concurrent ranging sessions are combined into a single combined ranging session, as discussed herein. If the UE 600 is a V-UE, it may be configured to control the automated driving of a vehicle, e.g., vehicle 102. For example, the UE 600 may include a vehicle interface 605 with which commands are provided to the vehicle for automated driving and sensory input, including speed and acceleration, may be provided from the vehicle to UE 600. The UE 600 may, for example, include one or more processors 602, memory 604, an inertial measurement unit (IMU) 607 that may include, e.g., an accelerometer, gyroscope, magnetometers, etc., which may be used to detect orientation with respect to a global or local reference frame and the motion or one or more motion characteristics of the vehicle, a satellite positioning system (SPS) receiver 609 to determine, e.g., a GPS position, and an external interface including, e.g., a Wireless Wide Area Network (WWAN) transceiver 610, and a Wireless Local Area Network (WLAN) transceiver 614, which may be operatively coupled with one or more connections 606 (e.g., buses, lines, fibers, links, etc.) to non-transitory computer readable medium 620 and memory 604. The UE 600 may further include additional items, which are not shown, such as a user interface that may include e.g., a display, a keypad or other input device, such as virtual keypad on the display, through which a user may interface with the user device. In certain example implementations, all or part of UE 600 may take the form of a chipset, and/or the like.

Transceiver 610 may be, e.g., a cellular transceiver, that is configured to transmit and receive direct communications in the wireless network, as illustrated in FIG. 1. The transceiver 610 may include a transmitter 611 enabled to transmit one or more signals over one or more types of wireless communication networks and a receiver 612 to receive one or more signals transmitted over the one or more types of wireless communication networks. Transceiver 614 may be, e.g., a short-range transceiver, and may be configured to transmit and receive direct communications in the wireless network, as illustrated in FIG. 1. The transceiver 614 may include a transmitter 615 enabled to transmit one or more signals, including ranging signals (PRS signals) and pre-ranging (pre-PRS) and post-ranging (post-PRS) messages, and combine and separate messages, over one or more types of wireless communication networks and a receiver 616 to receive one or more signals, e.g., including PRS and pre-PRS and post-PRS messages, combine and separate messages, transmitted over the one or more types of wireless communication networks. The transceivers 610 and 614 enable the UE 600 to communicate with transportation entities using D2D communication links, such as DSRC, C-V2X, or 5G NR.

In some embodiments, UE 600 may include antenna 609, which may be internal or external. The antenna 609 may be used to transmit and/or receive signals processed by transceiver 610 and/or transceiver 614. In some embodiments, antenna 609 may be coupled to transceiver 610 and/or transceiver 614. In some embodiments, measurements of signals received (transmitted) by UE 600 may be performed at the point of connection of the antenna 609 and transceiver 610 and/or transceiver 614. For example, the measurement point of reference for received (transmitted) RF signal measurements may be an input (output) terminal of the receivers 612, 616 (transmitters 611, 615) and an output (input) terminal of the antenna 609. In a UE 600 with multiple antennas 609 or antenna arrays, the antenna connector may be viewed as a virtual point representing the aggregate output (input) of multiple antennas. The phase difference of received signals at multiple antennas or antenna array may be used to determine the AoA of the signal with respect to the antenna array, which may be converted to a local or global reference frame based on a known orientation of the UE 600, e.g., based on the orientation of the UE 600 to the global or local reference frame as measured by the IMU 607.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of UE 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in UE 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in UE 600 is merely exemplary, and as such the functionality of the modules and/or data structures may be combined, separated, and/or be structured in different ways depending upon the implementation of the UE 600.

The medium 620 and/or memory 604 may include a pre-PRS message module 622 that when implemented by the one or more processors 602 configures the one or more processors 602 to generate and transmit or receive pre-ranging messages, such as pre-PRS messages, via the transceiver 614, e.g., to initiate a ranging session or to accept a ranging session. The pre-PRS messages may be broadcast, multicast, or unicast (with RRC connection). In some implementations, the PRS messages may be transmitted and received over a licensed spectrum. The pre-PRS message may be an initiating pre-PRS message to initiate a ranging session or a responding pre-PRS message to acknowledge an initiating pre-PRS message. The pre-PRS messages may include identifiers for the initiator UE and one or more responder UEs. The participating UEs may be determined, e.g., from capabilities messages received by the UE 600 or from monitoring multiple concurrent ranging sessions and identifying the participating UEs from the concurrent ranging sessions. The pre-PRS messages may further include ranging signal properties to be used in a ranging session and may include position information for the UE 600. For example, the pre-PRS message may include an identifier for the ranging signal and timing information (e.g., time slot number) of the ranging signal and frequency that will be used to broadcast the ranging signal. The frequency, for example, may be selected from an available set of bandwidths, and may be selected by sensing interference and choosing a channel with an average interference RSRP that is less than a threshold. In some implementations, an initiating pre-PRS message may include an indication of the number of PRS cycles requested and the current PRS cycle.

The medium 620 and/or memory 604 may include a PRS module 624 that when implemented by the one or more processors 602 configures the one or more processors 602 to broadcast and receive a ranging signal to and from other UEs in the ranging session, via the transceiver 614, as discussed herein. The ranging signal, for example, may be a PRS signal as discussed herein. The ranging signal may be broadcast at the determined time and with the identifier and at the frequencies indicated over the pre-PRS message. The ranging signal may be broadcast and received over unlicensed spectrum and may be broadcast pursuant to category 2 or category 4 LBT constraints. The one or more processors 602, for example, may be configured to measure the ToD of broadcast ranging signals and the ToA of received ranging signals, and may be configured to measure the AoD of broadcast ranging signals and the AoA of received ranging signals.

The medium 620 and/or memory 604 may include a post-PRS message module 626 that when implemented by the one or more processors 602 configures the one or more processors 602 to send and receive post-ranging messages to and from other UEs in the ranging session, via the transceiver 614, as discussed herein. The post-PRS messages that may include, e.g., an indication of the ToD, and in some implementations the AoD, of the broadcast ranging signals and an indication of the ToA, and in some implementations the AoA, of the received ranging signals. In some implementation, the indication of the ToD and ToA may be a difference between the ToD and ToA. In some implementations, the post-PRS messages may include an indication of the position of the UE.

The medium 620 and/or memory 604 may include a ranging/positioning module 628 that when implemented by the one or more processors 602 configures the one or more processors 602 to determine a range to another UE based on the ToD and ToA of broadcast and received ranging signals as measured by the UE 600 and received in the post-PRS messages from other UEs. The processor 602 may be further configured to determine a position of the UE 600, e.g., based on one or more ranges to broadcasting UEs and their location information using multilateration or other appropriate techniques discussed herein. For example, the one or more processors 602 may implement a Kalman filter or Extended Kalman filter to determine the range to other UEs and/or position of the UE 600.

The medium 620 and/or memory 604 may include a combine sessions module 630 that when implemented by the one or more processors 602 configures the one or more processors 602 to confirm the existence of independent concurrent ranging sessions initiated by different initiator UEs. The one or more processors 602 may be configured to determine the existence of independent concurrent ranging sessions based on the pre-PRS messages for each ranging session, which may list all participating UEs including different initiator UEs. In some implementations, the one or more processors 602 may be configured to determine the existence of independent concurrent ranging sessions by sensing whether the number of PRS cycles in both ranging sessions exceed a threshold within a time period. The number of PRS cycles may be determined by monitoring the number of PRS signal broadcasts or post-PRS messages, etc. If the number of PRS cycles from multiple ranging sessions exceeds the threshold within the time period, the independent ranging sessions may be considered concurrent and may be determined to be combined. The one or more processors 602 may be configured to send a combine message, via the transceiver 614, to the initiator UEs in each ranging session indicating that the ranging sessions should be combined, and that the UE 600 may initiate the combined ranging session, or to receive a combine message from another UE, if the UE 600 is an initiator UE. The combine message may include an indication of whether the position of the UE is known, and thus, the UE may serve as a positioning anchor. The one or more processors 602 may be further configured to measure one or more power characteristics, e.g., signal strength characteristics such as RSPR, of the ranging signals broadcast by the initiator UEs in each ranging session. The signal strength characteristics determined by the one or more processors 602 may be an average or other combination of the measured power characteristics for the multiple ranging sessions. The combine message may provide an indication of a signal strength characteristic of the ranging signals from the initiator UEs. The one or more processors 602 may be further configured to receive, via transceiver 614, a response message from the initiator UEs indicating that initiator UEs accept the combining of the ranging sessions and that the UE 600 is to initiate the combined ranging session. The one or more processors 602 may be configured to initiate a combined ranging session, e.g., by sending an initial pre-PRS message that includes all of the participating UEs from the independent ranging sessions. The one or more processors 602 may be further configured to select an initiator UE for a combined ranging session if multiple UEs send a combine message to the UE 600, where the selection may be based on whether ability to serve as an anchor point for positioning and signal strength characteristics. The one or more processors 602 may be further configured to send, via transceiver 614, a response message to the other UE indicating that UE 600 accept the combining of the ranging sessions and that the other UE is selected to initiate the combined ranging session. The one or more processors 602 may be further configured to send or receive, via transceiver 614, in capabilities messages (such as illustrated by messages 201 of FIG. 2), an indication of the availability of combining ranging sessions.

The medium 620 and/or memory 604 may include a separate sessions module 632 that when implemented by the one or more processors 602 configures the one or more processors 602 to determine whether to separate the combined ranging sessions. The one or more processors 602 may be configured to determine the number of ranging signals broadcast by one or more UEs that are not received by one or more UEs in the combined ranging session and if the number is greater than a threshold. The one or more processors 602 may be configured to sending a separate message, via the transceiver 614, to the previously initiator UEs indicating that the combined ranging session will be terminated and that the UEs should initiate independent ranging sessions. Where the UE 600 is one of the originally initiator UEs, the one or more processor 602 may be further configured to receive a message, via the transceiver 614, indicating that a combined ranging session will be terminated, and that the UE 600 should initiate independent ranging sessions.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The one or more processors 602 may be a general-purpose computer that once programmed to perform particular operations pursuant to instructions from program software as described herein operates as a special purpose computer programmed to perform the techniques disclosed herein.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program 608. For example, the non-transitory computer readable medium including program code 608 stored thereon may include program code 608 to support combining multiple independent ranging sessions into a single combined ranging session, in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include a transceiver 610 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random-access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable code 608 stored thereon, which if executed by one or more processors 602 may be operatively enabled to perform all or portions of the example operations as described herein. Computer readable medium 620 may be a part of memory 604.

Figure 7:
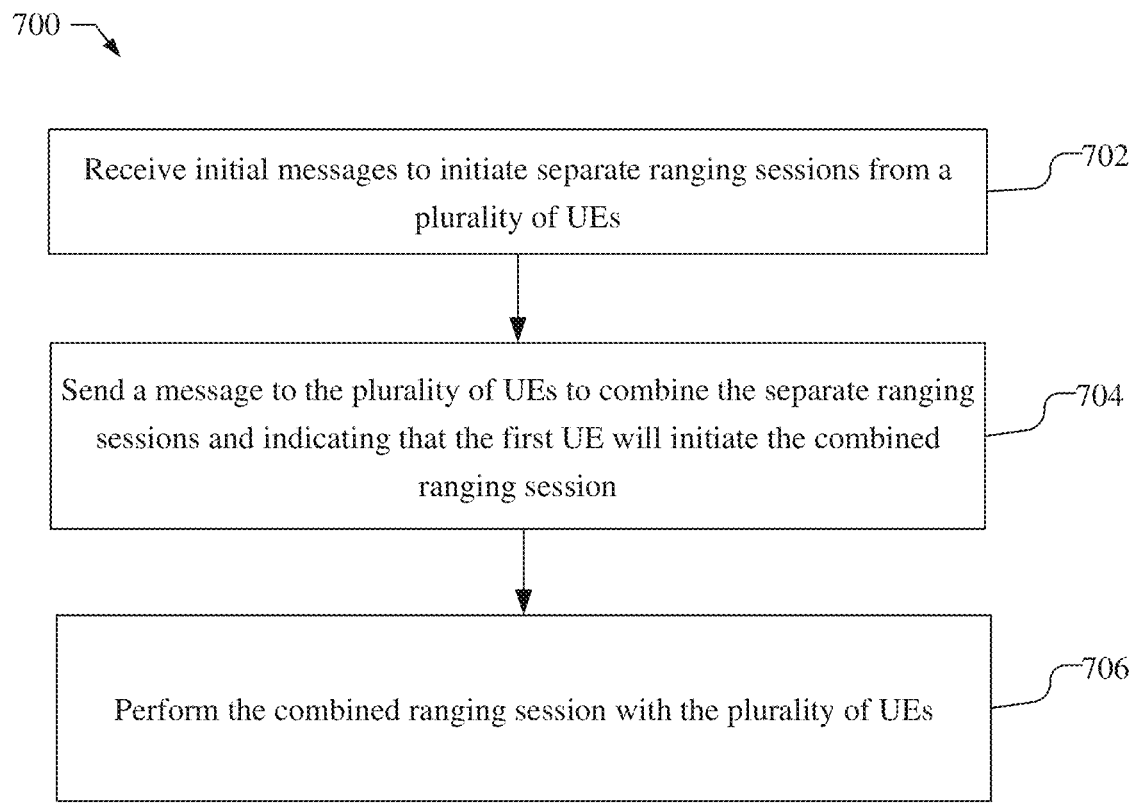
FIG. 7 is a flow chart illustrating a method of ranging between UEs.

FIG. 7 is a flow chart 700 illustrating a method of ranging between UEs performed by a first UE, such as UEA 310A.

At block 702, the first UE receives initial messages to initiate separate ranging sessions from a plurality of UEs, such as discussed at stages 1A, and 1B of FIG. 5. A means for receiving initial messages to initiate separate ranging sessions from a plurality of UEs may be, e.g., the transceiver 614 and the one or more processors 602 with dedicated hardware or implementing executable code or software instructions in memory 604 and/or medium 620, such as the pre-PRS message module 622.

At block 704, the first UE sends a message to the plurality of UEs to combine the separate ranging sessions and indicating that the first UE will initiate the combined ranging session, such as discussed at stage 3A of FIG. 5. The first UE and the plurality of UEs, for example, may each be one of a vehicle-based UE, a pedestrian based UE, or a roadside unit. A means for sending a message to the plurality of UEs to combine the separate ranging sessions and indicating that the first UE will initiate the combined ranging session may be, e.g., the transceiver 614 and the one or more processors 602 with dedicated hardware or implementing executable code or software instructions in memory 604 and/or medium 620, such as the combine sessions module 630.

At block 706, the first UE performs performing the combined ranging session with the plurality of UEs, such as discussed at stage 6 of FIG. 5. A means for performing the combined ranging session with the plurality of UEs may be, e.g., the transceiver 614 and the one or more processors 602 with dedicated hardware or implementing executable code or software instructions in memory 604 and/or medium 620, such as the pre-PRS message module 622, PRS module 624, post-PRS message module 626, and ranging/positioning module 628.

In one implementation, the first UE may determine that the separate ranging sessions are concurrent before sending the message to the plurality of UEs to combine the separate ranging sessions, e.g., as discussed at stage 2A of FIG. 5. A means for determining that the separate ranging sessions are concurrent before sending the message to the plurality of UEs to combine the separate ranging sessions may be, e.g., the transceiver 614 and the one or more processors 602 with dedicated hardware or implementing executable code or software instructions in memory 604 and/or medium 620, such as the combine sessions module 630.

In one implementation, the first UE may determine that the plurality of UEs initiate separate ranging sessions more than a predetermined number of times before sending the message to the plurality of UEs to combine the separate ranging sessions, e.g., as discussed at stage 2A of FIG. 5. A means for determining that the plurality of UEs initiate separate ranging sessions more than a predetermined number of times before sending the message to the plurality of UEs to combine the separate ranging sessions may be, e.g., the transceiver 614 and the one or more processors 602 with dedicated hardware or implementing executable code or software instructions in memory 604 and/or medium 620, such as the combine sessions module 630.

In one implementation, the first UE may send an initial message to the plurality of UEs to initiate the combined ranging session to the plurality of UEs, e.g., as discussed at stage 6 of FIG. 5. A means for sending an initial message to the plurality of UEs to initiate the combined ranging session to the plurality of UEs may be, e.g., the transceiver 614 and the one or more processors 602 with dedicated hardware or implementing executable code or software instructions in memory 604 and/or medium 620, such as the pre-PRS message module 622. For example, the first UE may receive response messages from the plurality of UEs indicating that each UE in the plurality of UEs accepts that the first UE will initiate the combined ranging session before sending the initial message to initiate the combined ranging session to the plurality of UEs, e.g., as discussed at stage 5 of FIG. 5. A means for receiving response messages from the plurality of UEs indicating that each UE in the plurality of UEs accepts that the first UE will initiate the combined ranging session before sending the initial message to initiate the combined ranging session to the plurality of UEs may be, e.g., the transceiver 614 and the one or more processors 602 with dedicated hardware or implementing executable code or software instructions in memory 604 and/or medium 620, such as the combine sessions module 630.

In another implementation, the first UE may perform the combined ranging session with the plurality of UEs by receiving an initial message from a second UE to initiate the combined ranging session with the plurality of UEs, wherein the combined ranging session includes the plurality of UEs and the second UE, e.g., as discussed at stages 3A, 3B, 4A, 4B, 5, and 6 of FIG. 5. A means for receiving an initial message from a second UE to initiate the combined ranging session with the plurality of UEs, wherein the combined ranging session includes the plurality of UEs and the second UE may be, e.g., the transceiver 614 and the one or more processors 602 with dedicated hardware or implementing executable code or software instructions in memory 604 and/or medium 620, such as the pre-PRS message module 622.

In one implementation, the message to the plurality of UEs to combine the separate ranging sessions and indicating that the first UE will initiate the combined ranging session further indicates that the first UE will be a positioning anchor, wherein the combined ranging session with the plurality of UEs comprises a combined positioning session using the first UE as the positioning anchor, e.g., as discussed at stages 3A and 6 of FIG. 5.

In one implementation, the first UE may determine signal strength characteristics of ranging signals in the separate ranging sessions initiated by the plurality of UEs, wherein the message to the plurality of UEs to combine the separate ranging sessions further indicates the signal strength characteristics of the ranging signals in the separate ranging sessions, as discussed at stages 2A and 3A of FIG. 5. A means for determining signal strength characteristics of ranging signals in the separate ranging sessions initiated by the plurality of UEs may be, e.g., the transceiver 614 and the one or more processors 602 with dedicated hardware or implementing executable code or software instructions in memory 604 and/or medium 620, such as the combine sessions module 630.

The combined ranging session includes all UEs that participated in the separate ranging sessions, including the first UE, the plurality of UEs and plurality of responder UEs, e.g., as discussed at stage 6. In some implementations, the first UE may determine ranging signals broadcast in a plurality of combined ranging sessions are not received by another UE more than a predetermined threshold number of times, e.g., as discussed at stage 7A of FIG. 5. The first UE may send a second message to the plurality of UEs to separate the combined ranging sessions and indicating that the plurality of UEs will initiate separate ranging sessions, as discussed at stage 8 of FIG. 5. A means for determining ranging signals broadcast in a plurality of combined ranging sessions are not received by another UE more than a predetermined threshold number of times and a means for sending a second message to the plurality of UEs to separate the combined ranging sessions and indicating that the plurality of UEs will initiate separate ranging sessions may be, e.g., the transceiver 614 and the one or more processors 602 with dedicated hardware or implementing executable code or software instructions in memory 604 and/or medium 620, such as the separate sessions module 632.

In one implementation, the first UE may receive capabilities messages from the plurality of UEs indicating availability of combining ranging sessions, wherein the message sent to the plurality of UEs to combine the separate ranging sessions is at least partially in response to the capabilities messages indicating the availability of combining ranging sessions, e.g., as discussed by messages 201 in FIG. 2 and stage 2A of FIG. 5. A means for receiving capabilities messages from the plurality of UEs indicating availability of combining ranging sessions, wherein the message sent to the plurality of UEs to combine the separate ranging sessions is at least partially in response to the capabilities messages indicating the availability of combining ranging sessions may be, e.g., the transceiver 614 and the one or more processors 602 with dedicated hardware or implementing executable code or software instructions in memory 604 and/or medium 620, such as the combine sessions module 630.

Figure 8:
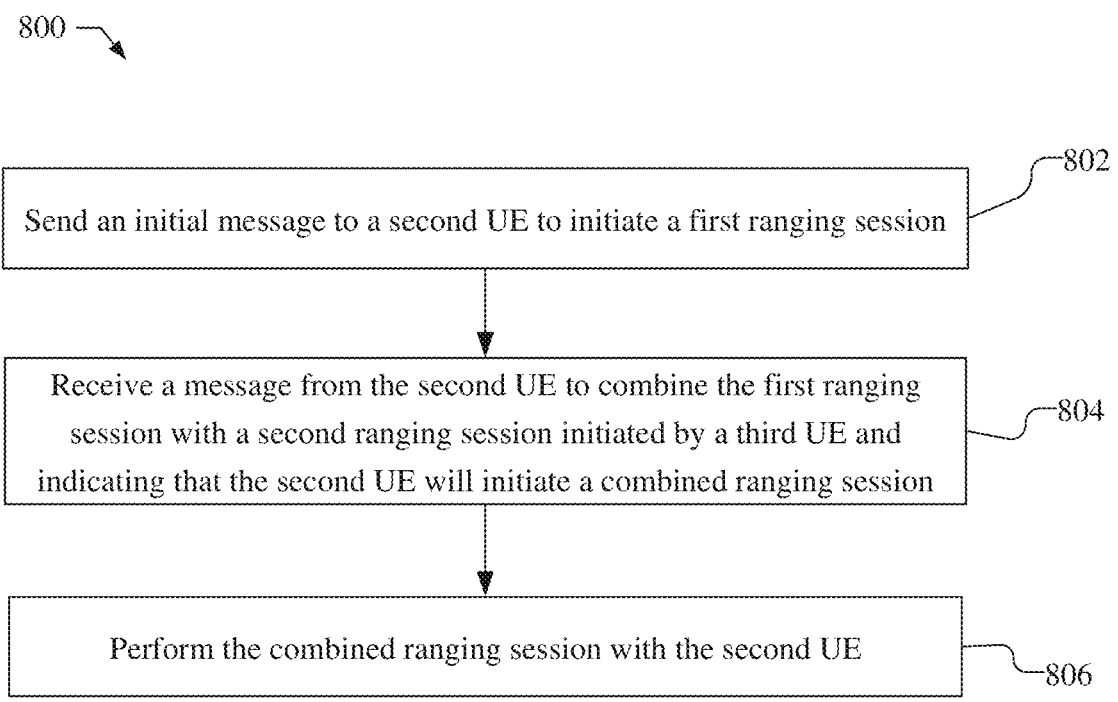
FIG. 8 is a flow chart illustrating a method of ranging between UEs.

FIG. 8 is a flow chart 800 illustrating a method of ranging between UEs performed by a first UE, such as UE1 302.

At block 802, the first UE sends an initial message to a second UE to initiate a first ranging session, such as discussed at stage 1A of FIG. 5. A means for sending an initial message to a second UE to initiate a first ranging session may be, e.g., the transceiver 614 and the one or more processors 602 with dedicated hardware or implementing executable code or software instructions in memory 604 and/or medium 620, such as the pre-PRS message module 622.

At block 804, the first UE receives a message from the second UE to combine the first ranging session with a second ranging session initiated by a third UE and indicating that the second UE will initiate a combined ranging session, such as discussed at stage 3A of FIG. 5. The first UE, the second UE, and the third UE, for example, may each be one of a vehicle-based UE, a pedestrian based UE, or a roadside unit. A means for receiving a message from the second UE to combine the first ranging session with a second ranging session initiated by a third UE and indicating that the second UE will initiate a combined ranging session may be, e.g., the transceiver 614 and the one or more processors 602 with dedicated hardware or implementing executable code or software instructions in memory 604 and/or medium 620, such as the combine sessions module 630.

At block 806, the first UE performs the combined ranging session with the second UE, such as discussed at stage 6 of FIG. 5. A means for performing the combined ranging session with the second UE may be, e.g., the transceiver 614 and the one or more processors 602 with dedicated hardware or implementing executable code or software instructions in memory 604 and/or medium 620, such as the pre-PRS message module 622, PRS module 624, post-PRS message module 626, and ranging/positioning module 628.

In one implementation, the second UE may determine that the first ranging session and the second ranging session are concurrent before sending the message to combine the first ranging session and the second ranging session, e.g., as discussed at stage 2A of FIG. 5. In one implementation, the second UE may determine that the first UE and the third UE have initiated separate ranging sessions more than a predetermined number of times before sending the message to combine the first ranging session and the second ranging session, e.g., as discussed at stage 2A of FIG. 5.

In one implementation, the first UE may receive an initial message from the second UE to initiate the combined ranging session, e.g., as discussed at stage 6 of FIG. 5. A means for receiving an initial message from the second UE to initiate the combined ranging session may be, e.g., the transceiver 614 and the one or more processors 602 with dedicated hardware or implementing executable code or software instructions in memory 604 and/or medium 620, such as the pre-PRS message module 622. For example, the first UE may send a response message to the second UE indicating that the second UE will initiate the combined ranging session, e.g., as discussed at stage 5 of FIG. 5. A means for sending a response message to the second UE indicating that the second UE will initiate the combined ranging session may be, e.g., the transceiver 614 and the one or more processors 602 with dedicated hardware or implementing executable code or software instructions in memory 604 and/or medium 620, such as the combine sessions module 630. The initial message, for example, may be sent by broadcasting the initial message to the second UE and a fourth UE to initiate the first ranging session, and the first UE may receive a second message from the fourth UE to combine the first ranging session with the second ranging session initiated by the third UE and indicating that the fourth UE will initiate the combined ranging session, e.g., as discussed at stage 3B of FIG. 5. The first UE may send the response message to the second UE indicating that the second UE will initiate the combined ranging session, e.g., as discussed at stage 5 of FIG. 5. The first UE may receive an initial message from the second UE to initiate the combined ranging session, wherein the combined ranging session includes the second UE, the third UE, and the fourth UE, e.g., as discussed at stage 6 of FIG. 5. A means for receiving a second message from the fourth UE to combine the first ranging session with the second ranging session initiated by the third UE and indicating that the fourth UE will initiate the combined ranging session may be, e.g., may be, e.g., the transceiver 614 and the one or more processors 602 with dedicated hardware or implementing executable code or software instructions in memory 604 and/or medium 620, such as the combine sessions module 630. A means for receiving an initial message from the second UE to initiate the combined ranging session, wherein the combined ranging session includes the second UE, the third UE, and the fourth UE may be, e.g., the transceiver 614 and the one or more processors 602 with dedicated hardware or implementing executable code or software instructions in memory 604 and/or medium 620, such as the pre-PRS message module 622. In one example, the message from the second UE may indicate that the second UE will be a positioning anchor and the second message from the fourth UE does not indicate that the fourth UE will be a positioning anchor, wherein the response message to the second UE indicating that the second UE will initiate the combined ranging session is sent in response to the second UE indicating that the second UE will be a positioning anchor, wherein the combined ranging session comprises a combined positioning session using the second UE as the positioning anchor, e.g., as discussed at stage 4A of FIG. 5. In another example, the message from the second UE may further indicate a first value of a signal strength characteristic for ranging signals in the first ranging session and the second ranging sessions measured by the second UE and the second message from the fourth UE indicates a second value of the signal strength characteristic for the ranging signals in the first ranging session and the second ranging sessions measured by the fourth UE, wherein the response message to the second UE indicating that the second UE will initiate the combined ranging session is sent in response to the first value of the signal strength characteristic being greater than the second value of the signal strength characteristic, e.g., as discussed at stage 4A of FIG. 5.

The combined ranging session includes all UEs that participated in the first ranging session and the second ranging session, including the first UE, the second UE, the third UE, and a plurality of responder UEs, e.g., as discussed at stage 6. In some implementations, the first UE may receive a second message from the second UE to separate the combined ranging sessions and indicating that the first UE will initiate the ranging sessions in response to the second UE determining that ranging signals broadcast in a plurality of combined ranging sessions is not received by another UE more than a predetermined threshold number of times, e.g., as discussed at stage 7A of FIG. 5. A means for receiving a second message from the second UE to separate the combined ranging sessions and indicating that the first UE will initiate the ranging sessions in response to the second UE determining that ranging signals broadcast in a plurality of combined ranging sessions is not received by another UE more than a predetermined threshold number of times may be, e.g., the transceiver 614 and the one or more processors 602 with dedicated hardware or implementing executable code or software instructions in memory 604 and/or medium 620, such as the separate sessions module 632.

In one implementation, the first UE may send a capability message indicating availability of combining ranging sessions, e.g., as illustrated by messages 201 in FIG. 2 and discussed at stage 2A in FIG. 5. A means for sending a capability message indicating availability of combining ranging sessions may be, e.g., the transceiver 614 and the one or more processors 602 with dedicated hardware or implementing executable code or software instructions in memory 604 and/or medium 620, such as the combine sessions module 630.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method of ranging between user equipments (UEs) performed by a first UE, the method comprising:
receiving initial messages to initiate separate ranging sessions from a plurality of UEs;
sending a message to the plurality of UEs to combine the separate ranging sessions and indicating that the first UE will initiate the combined ranging session; and
performing the combined ranging session with the plurality of UEs.

2. The method of clause 1, further comprising determining that the separate ranging sessions are concurrent before sending the message to the plurality of UEs to combine the separate ranging sessions.

3. The method of either of clauses 1 or 2, further comprising determining that the plurality of UEs initiate separate ranging sessions more than a predetermined number of times before sending the message to the plurality of UEs to combine the separate ranging sessions.

4. The method of any of clauses 1-3, further comprising sending an initial message to the plurality of UEs to initiate the combined ranging session to the plurality of UEs.

5. The method of clause 4, further comprising receiving response messages from the plurality of UEs indicating that each UE in the plurality of UEs accepts that the first UE will initiate the combined ranging session before sending the initial message to initiate the combined ranging session to the plurality of UEs.

6. The method of any of clauses 1-5, wherein performing the combined ranging session with the plurality of UEs comprises:
receiving an initial message from a second UE to initiate the combined ranging session with the plurality of UEs, wherein the combined ranging session includes the plurality of UEs and the second UE.

7. The method of any of clauses 1-6, wherein the message to the plurality of UEs to combine the separate ranging sessions and indicating that the first UE will initiate the combined ranging session further indicates that the first UE will be a positioning anchor, wherein the combined ranging session with the plurality of UEs comprises a combined positioning session using the first UE as the positioning anchor.

8. The method of any of clauses 1-7, further comprising:
determining signal strength characteristics of ranging signals in the separate ranging sessions initiated by the plurality of UEs;
wherein the message to the plurality of UEs to combine the separate ranging sessions further indicates the signal strength characteristics of the ranging signals in the separate ranging sessions.

9. The method of any of clauses 1-8, wherein the combined ranging session includes all UEs that participated in the separate ranging sessions, including the first UE, the plurality of UEs and plurality of responder UEs.

10. The method of clause 9, the method further comprising:
determining ranging signals broadcast in a plurality of combined ranging sessions is not received by another UE more than a predetermined threshold number of times;
sending a second message to the plurality of UEs to separate the combined ranging sessions and indicating that the plurality of UEs will initiate separate ranging sessions.

11. The method of clauses 1-10, further comprising receiving capabilities messages from the plurality of UEs indicating availability of combining ranging sessions, wherein the message sent to the plurality of UEs to combine the separate ranging sessions is at least partially in response to the capabilities messages indicating the availability of combining ranging sessions.

12. The method of any of clauses 1-11, wherein the first UE and the plurality of UEs are each one of a vehicle based UE, a pedestrian based UE, or a road side unit.

13. A first user equipment (UE) configured for ranging between UEs, the first UE comprising:

a wireless transceiver configured to wirelessly communicate with entities in a wireless network;
at least one memory; and
at least one processor coupled to the wireless transceiver and the at least one memory, wherein the at least one processor is configured to:
receive, via the wireless transceiver, initial messages to initiate separate ranging sessions from a plurality of UEs;
send, via the wireless transceiver, a message to the plurality of UEs to combine the separate ranging sessions and indicating that the first UE will initiate the combined ranging session; and
perform the combined ranging session with the plurality of UEs.

14. The first UE of clause 13, wherein the at least one processor is further configured to determine that the separate ranging sessions are concurrent before sending the message to the plurality of UEs to combine the separate ranging sessions.

15. The first UE of either of clauses 13 or 14, wherein the at least one processor is further configured to determine that the plurality of UEs initiate separate ranging sessions more than a predetermined number of times before sending the message to the plurality of UEs to combine the separate ranging sessions.

16. The first UE of any of clauses 13-15, wherein the at least one processor is further configured to send an initial message to the plurality of UEs to initiate the combined ranging session to the plurality of UEs.

17. The first UE of clause 16, wherein the at least one processor is further configured to receive response messages from the plurality of UEs indicating that each UE in the plurality of UEs accepts that the first UE will initiate the combined ranging session before sending the initial message to initiate the combined ranging session to the plurality of UEs.

18. The first UE of any of clauses 13-17, wherein the at least one processor is configured to perform the combined ranging session with the plurality of UEs by being configured to:
receive, via the wireless transceiver, an initial message from a second UE to initiate the combined ranging session with the plurality of UEs, wherein the combined ranging session includes the plurality of UEs and the second UE.

19. The first UE of any of clauses 13-18, wherein the message to the plurality of UEs to combine the separate ranging sessions and indicating that the first UE will initiate the combined ranging session further indicates that the first UE will be a positioning anchor, wherein the combined ranging session with the plurality of UEs comprises a combined positioning session using the first UE as the positioning anchor.

20. The first UE of any of clauses 13-19, wherein the at least one processor is further configured to:
determine signal strength characteristics of ranging signals in the separate ranging sessions initiated by the plurality of UEs;
wherein the message to the plurality of UEs to combine the separate ranging sessions further indicates the signal strength characteristics of the ranging signals in the separate ranging sessions.

21. The first UE of any of clauses 13-20, wherein the combined ranging session includes all UEs that participated in the separate ranging sessions, including the first UE, the plurality of UEs and plurality of responder UEs.

22. The first UE of clause 21, wherein the at least one processor is further configured to:
determine ranging signals broadcast in a plurality of combined ranging sessions is not received by another UE more than a predetermined threshold number of times;
send, via the wireless transceiver, a second message to the plurality of UEs to separate the combined ranging sessions and indicating that the plurality of UEs will initiate separate ranging sessions.

23. The first UE of any of clauses 13-22, wherein the at least one processor is further configured to receive, via the wireless transceiver, capabilities messages from the plurality of UEs indicating availability of combining ranging sessions, wherein the message sent to the plurality of UEs to combine the separate ranging sessions is at least partially in response to the capabilities messages indicating the availability of combining ranging sessions.

24. The first UE of any of clauses 13-23, wherein the first UE and the plurality of UEs are each one of a vehicle based UE, a pedestrian based UE, or a road side unit.

25. A first user equipment (UE) configured for ranging between UEs, the first UE comprising:

means for receiving initial messages to initiate separate ranging sessions from a plurality of UEs;
means for sending a message to the plurality of UEs to combine the separate ranging sessions and indicating that the first UE will initiate the combined ranging session; and
means for performing the combined ranging session with the plurality of UEs.

26. The first UE of clause 25, further comprising means for determining that the separate ranging sessions are concurrent before sending the message to the plurality of UEs to combine the separate ranging sessions.

27. The first UE of either of clauses 25 or 26, further comprising means for determining that the plurality of UEs initiate separate ranging sessions more than a predetermined number of times before sending the message to the plurality of UEs to combine the separate ranging sessions.

28. The first UE of any of clauses 25-27, further comprising means for sending an initial message to the plurality of UEs to initiate the combined ranging session to the plurality of UEs.

29. The first UE of clause 28, further comprising means for receiving response messages from the plurality of UEs indicating that each UE in the plurality of UEs accepts that the first UE will initiate the combined ranging session before sending the initial message to initiate the combined ranging session to the plurality of UEs.

30. The first UE of any of clauses 25-29, wherein means for performing the combined ranging session with the plurality of UEs comprises:
means for receiving an initial message from a second UE to initiate the combined ranging session with the plurality of UEs, wherein the combined ranging session includes the plurality of UEs and the second UE.

31. The first UE of any of clauses 25-30, wherein the message to the plurality of UEs to combine the separate ranging sessions and indicating that the first UE will initiate the combined ranging session further indicates that the first UE will be a positioning anchor, wherein the combined ranging session with the plurality of UEs comprises a combined positioning session using the first UE as the positioning anchor.

32. The first UE of any of clauses 25-31, further comprising:

means for determining signal strength characteristics of ranging signals in the separate ranging sessions initiated by the plurality of UEs;

wherein the message to the plurality of UEs to combine the separate ranging sessions further indicates the signal strength characteristics of the ranging signals in the separate ranging sessions.

33. The first UE of any of clauses 25-32, wherein the combined ranging session includes all UEs that participated in the separate ranging sessions, including the first UE, the plurality of UEs and plurality of responder UEs.

34. The first UE of clause 33, further comprising:

means for determining ranging signals broadcast in a plurality of combined ranging sessions is not received by another UE more than a predetermined threshold number of times;

means for sending a second message to the plurality of UEs to separate the combined ranging sessions and indicating that the plurality of UEs will initiate separate ranging sessions.

35. The first UE of clauses 25-34, further comprising means for receiving capabilities messages from the plurality of UEs indicating availability of combining ranging sessions, wherein the message sent to the plurality of UEs to combine the separate ranging sessions is at least partially in response to the capabilities messages indicating the availability of combining ranging sessions.

36. The first UE of any of clauses 25-35, wherein the first UE and the plurality of UEs are each one of a vehicle based UE, a pedestrian based UE, or a road side unit.

37. A non-transitory storage medium including program code stored thereon, the program code is operable to configure at least one processor in a first user equipment (UE) for ranging between UEs, the program code comprising instructions to:

receive initial messages to initiate separate ranging sessions from a plurality of UEs;

send a message to the plurality of UEs to combine the separate ranging sessions and indicating that the first UE will initiate the combined ranging session; and perform the combined ranging session with the plurality of UEs.

38. The non-transitory storage medium including program code of clause 37, further comprising program code to determine that the separate ranging sessions are concurrent before sending the message to the plurality of UEs to combine the separate ranging sessions.

39. The non-transitory storage medium including program code of either of clauses 37 or 38, further comprising program code to determine that the plurality of UEs initiate separate ranging sessions more than a predetermined number of times before sending the message to the plurality of UEs to combine the separate ranging sessions.

40. The non-transitory storage medium including program code of any of clauses 37-39, further comprising program code to send an initial message to the plurality of UEs to initiate the combined ranging session to the plurality of UEs.

41. The non-transitory storage medium including program code of clause 40, further comprising program code to receive response messages from the plurality of UEs indicating that each UE in the plurality of UEs accepts that the first UE will initiate the combined ranging session before sending the initial message to initiate the combined ranging session to the plurality of UEs.

42. The non-transitory storage medium including program code of any of clauses 37-41, wherein the program code to performing the combined ranging session with the plurality of UEs comprises program code to:

receive an initial message from a second UE to initiate the combined ranging session with the plurality of UEs, wherein the combined ranging session includes the plurality of UEs and the second UE.

43. The non-transitory storage medium including program code of any of clauses 37-42, wherein the message to the plurality of UEs to combine the separate ranging sessions and indicating that the first UE will initiate the combined ranging session further indicates that the first UE will be a positioning anchor, wherein the combined ranging session with the plurality of UEs comprises a combined positioning session using the first UE as the positioning anchor.

44. The non-transitory storage medium including program code of any of clauses 37-43, further comprising program code to:

determine signal strength characteristics of ranging signals in the separate ranging sessions initiated by the plurality of UEs;

wherein the message to the plurality of UEs to combine the separate ranging sessions further indicates the signal strength characteristics of the ranging signals in the separate ranging sessions.

45. The non-transitory storage medium including program code of any of clauses 37-44, wherein the combined ranging session includes all UEs that participated in the separate ranging sessions, including the first UE, the plurality of UEs and plurality of responder UEs.

46. The non-transitory storage medium including program code of clause 45, further comprising program code to:

determine ranging signals broadcast in a plurality of combined ranging sessions is not received by another UE more than a predetermined threshold number of times;

send a second message to the plurality of UEs to separate the combined ranging sessions and indicating that the plurality of UEs will initiate separate ranging sessions.

47. The non-transitory storage medium including program code of any of clauses 37-46, further comprising program code to receive capabilities messages from the plurality of UEs indicating availability of combining ranging sessions, wherein the message sent to the plurality of UEs to combine the separate ranging sessions is at least partially in response to the capabilities messages indicating the availability of combining ranging sessions.

48. The non-transitory storage medium including program code of any of clauses 37-47, wherein the first UE and the plurality of UEs are each one of a vehicle based UE, a pedestrian based UE, or a road side unit.

49. A method of ranging between user equipments (UEs) performed by a first UE, the method comprising:

sending an initial message to a second UE to initiate a first ranging session;

receiving a message from the second UE to combine the first ranging session with a second ranging session initiated by a third UE and indicating that the second UE will initiate a combined ranging session; and performing the combined ranging session with the second UE.

50. The method of clause 49, wherein the second UE determines that the first ranging session and the second ranging session are concurrent before sending the message to combine the first ranging session and the second ranging session.

51. The method of either of clauses 49 or 50, wherein the second UE determines that the first UE and the third UE have initiated separate ranging sessions more than a predetermined number of times before sending the message to combine the first ranging session and the second ranging session.

52. The method of any of clauses 49-51, further comprising receiving an initial message from the second UE to initiate the combined ranging session.

53. The method of clause 52, further comprising sending a response message to the second UE indicating that the second UE will initiate the combined ranging session.

54. The method of clause 53, wherein sending the initial message comprises broadcasting the initial message to the second UE and a fourth UE to initiate the first ranging session, the method further comprising:

receiving a second message from the fourth UE to combine the first ranging session with the second ranging session initiated by the third UE and indicating that the fourth UE will initiate the combined ranging session;

sending the response message to the second UE indicating that the second UE will initiate the combined ranging session;

receiving an initial message from the second UE to initiate the combined ranging session;

wherein the combined ranging session includes the second UE, the third UE, and the fourth UE.

55. The method of clause 54, wherein the message from the second UE indicates that the second UE will be a positioning anchor and the second message from the fourth UE does not indicates that the fourth UE will be a positioning anchor, and wherein sending the response message to the second UE indicating that the second UE will initiate the combined ranging session is in response to the second UE indicating that the second UE will be a positioning anchor, wherein the combined ranging session comprises a combined positioning session using the second UE as the positioning anchor.

56. The method of clause 54, wherein the message from the second UE further indicates a first value of a signal strength characteristic for ranging signals in the first ranging session and the second ranging sessions measured by the second UE and the second message from the fourth UE indicates a second value of the signal strength characteristic for the ranging signals in the first ranging session and the second ranging sessions measured by the fourth UE, and wherein sending the response message to the second UE indicating that the second UE will initiate the combined ranging session is in response to the first value of the signal strength characteristic being greater than the second value of the signal strength characteristic.

57. The method of any of clauses 49-56, wherein the combined ranging session includes all UEs that participated in the first ranging session and the second ranging session, including the first UE, the second UE, the third UE, and a plurality of responder UEs.

58. The method of clause 57, the method further comprising:

receiving a second message from the second UE to separate the combined ranging sessions and indicating that the first UE will initiate the ranging sessions in response to the second UE determining that ranging signals broadcast in a plurality of combined ranging sessions is not received by another UE more than a predetermined threshold number of times.

59. The method of clauses 49-58, further comprising sending a capability message indicating availability of combining ranging sessions.

60. The method of any of clauses 49-59, wherein the first UE, the second UE, and the third UE are each one of a vehicle based UE, a pedestrian based UE, or a road side unit.

61. A first user equipment (UE) configured for ranging between UEs, the first UE comprising:

a wireless transceiver configured to wirelessly communicate with entities in a wireless network;

at least one memory; and at least one processor coupled to the wireless transceiver and the at least one memory, wherein the at least one processor is configured to:

send, via the wireless transceiver, an initial message to a second UE to initiate a first ranging session;

receive, via the wireless transceiver, a message from the second UE to combine the first ranging session with a second ranging session initiated by a third UE and indicating that the second UE will initiate a combined ranging session; and perform the combined ranging session with the second UE.

62. The first UE of clause 61, wherein the second UE determines that the first ranging session and the second ranging session are concurrent before sending the message to combine the first ranging session and the second ranging session.

63. The first UE of either of clauses 61 or 62, wherein the second UE determines that the first UE and the third UE have initiated separate ranging sessions more than a predetermined number of times before sending the message to combine the first ranging session and the second ranging session.

64. The first UE of any of clauses 61-63, wherein the at least one processor is further configured to receive an initial message from the second UE to initiate the combined ranging session.

65. The first UE of clause 64, wherein the at least one processor is further configured to send a response message to the second UE indicating that the second UE will initiate the combined ranging session.

66. The first UE of clause 65, wherein the at least one processor is configured to send the initial message by being configured to broadcast the initial message to the second UE and a fourth UE to initiate the first ranging session, the at least one processor is further configured to:

receive, via the wireless transceiver, a second message from the fourth UE to combine the first ranging session with the second ranging session initiated by the third UE and indicating that the fourth UE will initiate the combined ranging session;

send, via the wireless transceiver, the response message to the second UE indicating that the second UE will initiate the combined ranging session;

receive, via the wireless transceiver, an initial message from the second UE to initiate the combined ranging session;

wherein the combined ranging session includes the second UE, the third UE, and the fourth UE.

67. The first UE of clause 66, wherein the message from the second UE indicates that the second UE will be a positioning anchor and the second message from the fourth UE does not indicates that the fourth UE will be a positioning anchor, and wherein the at least one processor is configured to send the response message to the second UE indicating that the second UE will initiate the combined ranging session is in response to the second UE indicating that the second UE will be a positioning anchor, wherein the combined ranging session comprises a combined positioning session using the second UE as the positioning anchor.

68. The first UE of clause 66, wherein the message from the second UE further indicates a first value of a signal strength characteristic for ranging signals in the first ranging session and the second ranging sessions measured by the second UE and the second message from the fourth UE indicates a second value of the signal strength characteristic for the ranging signals in the first ranging session and the second ranging sessions measured by the fourth UE, and wherein the at least one processor is configured to send the response message to the second UE indicating that the second UE will initiate the combined ranging session is in response to the first value of the signal strength characteristic being greater than the second value of the signal strength characteristic.

69. The first UE of any of clauses 61-68, wherein the combined ranging session includes all UEs that participated in the first ranging session and the second ranging session, including the first UE, the second UE, the third UE, and a plurality of responder UEs.

70. The first UE of clause 69, wherein the at least one processor is further configured to:
receive, via the wireless transceiver, a second message from the second UE to separate the combined ranging sessions and indicating that the first UE will initiate the ranging sessions in response to the second UE determining that ranging signals broadcast in a plurality of combined ranging sessions is not received by another UE more than a predetermined threshold number of times.

71. The first UE of any of clauses 61-70, wherein the at least one processor is further configured to send, via the wireless transceiver, a capability message indicating availability of combining ranging sessions.

72. The first UE of any of clauses 61-71, wherein the first UE, the second UE, and the third UE are each one of a vehicle based UE, a pedestrian based UE, or a road side unit.

73. A first user equipment (UE) configured for ranging between UEs, the first UE comprising:
means for sending an initial message to a second UE to initiate a first ranging session;
means for receiving a message from the second UE to combine the first ranging session with a second ranging session initiated by a third UE and indicating that the second UE will initiate a combined ranging session; and
means for performing the combined ranging session with the second UE.

74. The first UE of clause 73, wherein the second UE determines that the first ranging session and the second ranging session are concurrent before sending the message to combine the first ranging session and the second ranging session.

75. The first UE of either of clauses 73 or 74, wherein the second UE determines that the first UE and the third UE have initiated separate ranging sessions more than a predetermined number of times before sending the message to combine the first ranging session and the second ranging session.

76. The first UE of any of clauses 73-75, further comprising means for receiving an initial message from the second UE to initiate the combined ranging session.

77. The first UE of clause 76, further comprising means for sending a response message to the second UE indicating that the second UE will initiate the combined ranging session.

78. The first UE of clause 77, wherein the means for sending the initial message comprises broadcasting the initial message to the second UE and a fourth UE to initiate the first ranging session comprises:
means for receiving a second message from the fourth UE to combine the first ranging session with the second ranging session initiated by the third UE and indicating that the fourth UE will initiate the combined ranging session;
means for sending the response message to the second UE indicating that the second UE will initiate the combined ranging session;
means for receiving an initial message from the second UE to initiate the combined ranging session;
wherein the combined ranging session includes the second UE, the third UE, and the fourth UE.

79. The first UE of clause 78, wherein the message from the second UE indicates that the second UE will be a positioning anchor and the second message from the fourth UE does not indicates that the fourth UE will be a positioning anchor, and wherein the means for sending the response message to the second UE indicating that the second UE will initiate the combined ranging session responds to the second UE indicating that the second UE will be a positioning anchor, wherein the combined ranging session comprises a combined positioning session using the second UE as the positioning anchor.

80. The first UE of clause 78, wherein the message from the second UE further indicates a first value of a signal strength characteristic for ranging signals in the first ranging session and the second ranging sessions measured by the second UE and the second message from the fourth UE indicates a second value of the signal strength characteristic for the ranging signals in the first ranging session and the second ranging sessions measured by the fourth UE, and wherein the means for sending the response message to the second UE indicating that the second UE will initiate the combined ranging session responds to the first value of the signal strength characteristic being greater than the second value of the signal strength characteristic.

81. The first UE of any of clauses 73-80, wherein the combined ranging session includes all UEs that participated in the first ranging session and the second ranging session, including the first UE, the second UE, the third UE, and a plurality of responder UEs.

82. The first UE of clause 81, further comprising:
means for receiving a second message from the second UE to separate the combined ranging sessions and indicating that the first UE will initiate the ranging sessions in response to the second UE determining that ranging signals broadcast in a plurality of combined ranging sessions is not received by another UE more than a predetermined threshold number of times.

83. The first UE of any of clauses 73-82, further comprising sending a capability message indicating availability of combining ranging sessions.

84. The first UE of any of clauses 73-83, wherein the first UE, the second UE, and the third UE are each one of a vehicle based UE, a pedestrian based UE, or a road side unit.

85. A non-transitory storage medium including program code stored thereon, the program code is operable to configure at least one processor in a first user equipment (UE) for ranging between UEs, the program code comprising instructions to:
send an initial message to a second UE to initiate a first ranging session;
receive a message from the second UE to combine the first ranging session with a second ranging session initiated by a third UE and indicating that the second UE will initiate a combined ranging session; and perform the combined ranging session with the second UE.

86. The non-transitory storage medium including program code of clause 85, wherein the second UE determines that the first ranging session and the second ranging session are concurrent before sending the message to combine the first ranging session and the second ranging session.

87. The non-transitory storage medium including program code of either of clauses 85 or 86, wherein the second UE determines that the first UE and the third UE have initiated separate ranging sessions more than a predetermined number of times before sending the message to combine the first ranging session and the second ranging session.

88. The non-transitory storage medium including program code of any of clauses 85-87, further comprising program code to receive an initial message from the second UE to initiate the combined ranging session.

89. The non-transitory storage medium including program code of clause 88, further comprising program code to send a response message to the second UE indicating that the second UE will initiate the combined ranging session.

90. The non-transitory storage medium including program code of clause 89, wherein the program code to send the initial message comprises program code to broadcast the initial message to the second UE and a fourth UE to initiate the first ranging session, further comprising program code to:

receive a second message from the fourth UE to combine the first ranging session with the second ranging session initiated by the third UE and indicating that the fourth UE will initiate the combined ranging session;

send the response message to the second UE indicating that the second UE will initiate the combined ranging session;

receive an initial message from the second UE to initiate the combined ranging session;

wherein the combined ranging session includes the second UE, the third UE, and the fourth UE.

91. The non-transitory storage medium including program code of clause 90, wherein the message from the second UE indicates that the second UE will be a positioning anchor and the second message from the fourth UE does not indicates that the fourth UE will be a positioning anchor, and wherein the program code to send the response message to the second UE indicating that the second UE will initiate the combined ranging session responds to the second UE indicating that the second UE will be a positioning anchor, wherein the combined ranging session comprises a combined positioning session using the second UE as the positioning anchor.

92. The non-transitory storage medium including program code of clause 90, wherein the message from the second UE further indicates a first value of a signal strength characteristic for ranging signals in the first ranging session and the second ranging sessions measured by the second UE and the second message from the fourth UE indicates a second value of the signal strength characteristic for the ranging signals in the first ranging session and the second ranging sessions measured by the fourth UE, and wherein the program code to send the response message to the second UE indicating that the second UE will initiate the combined ranging session responds to the first value of the signal strength characteristic being greater than the second value of the signal strength characteristic.

93. The non-transitory storage medium including program code of any of clauses 85-92, wherein the combined ranging session includes all UEs that participated in the first ranging session and the second ranging session, including the first UE, the second UE, the third UE, and a plurality of responder UEs.

94. The non-transitory storage medium including program code of clause 93, further comprising program code to:

receive a second message from the second UE to separate the combined ranging sessions and indicating that the first UE will initiate the ranging sessions in response to the second UE determining that ranging signals broadcast in a plurality of combined ranging sessions is not received by another UE more than a predetermined threshold number of times.

95. The non-transitory storage medium including program code of any of clauses 85-94, further comprising program code to send a capability message indicating availability of combining ranging sessions.

96. The non-transitory storage medium including program code of any of clauses 85-95, wherein the first UE, the second UE, and the third UE are each one of a vehicle based UE, a pedestrian based UE, or a road side unit.

Therefore, it is intended that claimed subject matter not be limited to the particular examples disclosed, but that such claimed subject matter may also include all aspects falling within the scope of appended claims, and equivalents thereof.

What is claimed is:

1. A method of ranging between user equipments (UEs) performed by a first UE, the method comprising:

receiving initial messages to initiate separate ranging sessions from a plurality of UEs;

sending a message to the plurality of UEs to combine the separate ranging sessions and indicating that the first UE will initiate the combined ranging session; and performing the combined ranging session with the plurality of UEs.

2. The method of claim 1, further comprising determining that the separate ranging sessions are concurrent before sending the message to the plurality of UEs to combine the separate ranging sessions.

3. The method of claim 1, further comprising determining that the plurality of UEs initiate separate ranging sessions more than a predetermined number of times before sending the message to the plurality of UEs to combine the separate ranging sessions.

4. The method of claim 1, further comprising sending an initial message to the plurality of UEs to initiate the combined ranging session to the plurality of UEs.

5. The method of claim 4, further comprising receiving response messages from the plurality of UEs indicating that each UE in the plurality of UEs accepts that the first UE will initiate the combined ranging session before sending the initial message to initiate the combined ranging session to the plurality of UEs.

6. The method of claim 1, wherein performing the combined ranging session with the plurality of UEs comprises:

receiving an initial message from a second UE to initiate the combined ranging session with the plurality of UEs, wherein the combined ranging session includes the plurality of UEs and the second UE.

7. The method of claim 1, wherein the message to the plurality of UEs to combine the separate ranging sessions and indicating that the first UE will initiate the combined ranging session further indicates that the first UE will be a positioning anchor, wherein the combined ranging session with the plurality of UEs comprises a combined positioning session using the first UE as the positioning anchor.

8. The method of claim 1, further comprising:
determining signal strength characteristics of ranging signals in the separate ranging sessions initiated by the plurality of UEs;
wherein the message to the plurality of UEs to combine the separate ranging sessions further indicates the signal strength characteristics of the ranging signals in the separate ranging sessions.

9. The method of claim 1, wherein the combined ranging session includes all UEs that participated in the separate ranging sessions, including the first UE, the plurality of UEs and plurality of responder UEs.

10. The method of claim 9, the method further comprising:
determining ranging signals broadcast in a plurality of combined ranging sessions is not received by another UE more than a predetermined threshold number of times;
sending a second message to the plurality of UEs to separate the combined ranging sessions and indicating that the plurality of UEs will initiate separate ranging sessions.

11. The method of claim 1, further comprising receiving capabilities messages from the plurality of UEs indicating availability of combining ranging sessions, wherein the message sent to the plurality of UEs to combine the separate ranging sessions is at least partially in response to the capabilities messages indicating the availability of combining ranging sessions.

12. The method of claim 1, wherein the first UE and the plurality of UEs are each one of a vehicle based UE, a pedestrian based UE, or a roadside unit.

13. A first user equipment (UE) configured for ranging between UEs, the first UE comprising:
a wireless transceiver configured to wirelessly communicate with entities in a wireless network;
at least one memory; and
at least one processor coupled to the wireless transceiver and the at least one memory, wherein the at least one processor is configured to:
receive, via the wireless transceiver, initial messages to initiate separate ranging sessions from a plurality of UEs;
send, via the wireless transceiver, a message to the plurality of UEs to combine the separate ranging sessions and indicating that the first UE will initiate the combined ranging session; and
perform the combined ranging session with the plurality of UEs.

14. The first UE of claim 13, wherein the at least one processor is further configured to determine that the separate ranging sessions are concurrent before sending the message to the plurality of UEs to combine the separate ranging sessions.

15. The first UE of claim 13, wherein the at least one processor is further configured to determine that the plurality of UEs initiate separate ranging sessions more than a predetermined number of times before sending the message to the plurality of UEs to combine the separate ranging sessions.

16. The first UE of claim 13, wherein the at least one processor is further configured to send an initial message to the plurality of UEs to initiate the combined ranging session to the plurality of UEs.

17. The first UE of claim 16, wherein the at least one processor is further configured to receive response messages from the plurality of UEs indicating that each UE in the plurality of UEs accepts that the first UE will initiate the combined ranging session before sending the initial message to initiate the combined ranging session to the plurality of UEs.

18. The first UE of claim 13, wherein the at least one processor is configured to perform the combined ranging session with the plurality of UEs by being configured to:
receive, via the wireless transceiver, an initial message from a second UE to initiate the combined ranging session with the plurality of UEs, wherein the combined ranging session includes the plurality of UEs and the second UE.

19. The first UE of claim 13, wherein the message to the plurality of UEs to combine the separate ranging sessions and indicating that the first UE will initiate the combined ranging session further indicates that the first UE will be a positioning anchor, wherein the combined ranging session with the plurality of UEs comprises a combined positioning session using the first UE as the positioning anchor.

20. The first UE of claim 13, wherein the at least one processor is further configured to:
determine signal strength characteristics of ranging signals in the separate ranging sessions initiated by the plurality of UEs;
wherein the message to the plurality of UEs to combine the separate ranging sessions further indicates the signal strength characteristics of the ranging signals in the separate ranging sessions.

21. The first UE of claim 13, wherein the combined ranging session includes all UEs that participated in the separate ranging sessions, including the first UE, the plurality of UEs and plurality of responder UEs.

22. The first UE of claim 21, wherein the at least one processor is further configured to:
determine ranging signals broadcast in a plurality of combined ranging sessions is not received by another UE more than a predetermined threshold number of times;
send, via the wireless transceiver, a second message to the plurality of UEs to separate the combined ranging sessions and indicating that the plurality of UEs will initiate separate ranging sessions.

23. The first UE of claim 13, wherein the at least one processor is further configured to receive, via the wireless transceiver, capabilities messages from the plurality of UEs indicating availability of combining ranging sessions, wherein the message sent to the plurality of UEs to combine the separate ranging sessions is at least partially in response to the capabilities messages indicating the availability of combining ranging sessions.

24. The first UE of claim 13, wherein the first UE and the plurality of UEs are each one of a vehicle based UE, a pedestrian based UE, or a roadside unit.

25. A first user equipment (UE) configured for ranging between UEs, the first UE comprising:
means for receiving initial messages to initiate separate ranging sessions from a plurality of UEs;
means for sending a message to the plurality of UEs to combine the separate ranging sessions and indicating that the first UE will initiate the combined ranging session; and
means for performing the combined ranging session with the plurality of UEs.

26. The first UE of claim 25, further comprising means for determining that the separate ranging sessions are concurrent before sending the message to the plurality of UEs to combine the separate ranging sessions.

27. The first UE of claim 25, further comprising means for determining that the plurality of UEs initiate separate ranging sessions more than a predetermined number of times before sending the message to the plurality of UEs to combine the separate ranging sessions.

28. The first UE of claim 25, further comprising means for sending an initial message to the plurality of UEs to initiate the combined ranging session to the plurality of UEs.

29. A method of ranging between user equipments (UEs) performed by a first UE, the method comprising:
sending an initial message to a second UE to initiate a first ranging session;
receiving a message from the second UE to combine the first ranging session with a second ranging session initiated by a third UE and indicating that the second UE will initiate a combined ranging session; and
performing the combined ranging session with the second UE.

30. The method of claim 29, wherein the second UE determines that the first ranging session and the second ranging session are concurrent before sending the message to combine the first ranging session and the second ranging session.

31. The method of claim 29, wherein the second UE determines that the first UE and the third UE have initiated separate ranging sessions more than a predetermined number of times before sending the message to combine the first ranging session and the second ranging session.

32. The method of claim 29, further comprising receiving an initial message from the second UE to initiate the combined ranging session.

33. The method of claim 32, further comprising sending a response message to the second UE indicating that the second UE will initiate the combined ranging session.

34. The method of claim 33, wherein sending the initial message comprises broadcasting the initial message to the second UE and a fourth UE to initiate the first ranging session, the method further comprising:
receiving a second message from the fourth UE to combine the first ranging session with the second ranging session initiated by the third UE and indicating that the fourth UE will initiate the combined ranging session;
sending the response message to the second UE indicating that the second UE will initiate the combined ranging session;
receiving an initial message from the second UE to initiate the combined ranging session;
wherein the combined ranging session includes the second UE, the third UE, and the fourth UE.

35. The method of claim 34, wherein the message from the second UE indicates that the second UE will be a positioning anchor and the second message from the fourth UE does not indicates that the fourth UE will be a positioning anchor, and wherein sending the response message to the second UE indicating that the second UE will initiate the combined ranging session is in response to the second UE indicating that the second UE will be a positioning anchor, wherein the combined ranging session comprises a combined positioning session using the second UE as the positioning anchor.

36. The method of claim 34, wherein the message from the second UE further indicates a first value of a signal strength characteristic for ranging signals in the first ranging session and the second ranging sessions measured by the second UE and the second message from the fourth UE indicates a second value of the signal strength characteristic for the ranging signals in the first ranging session and the second ranging sessions measured by the fourth UE, and wherein sending the response message to the second UE indicating that the second UE will initiate the combined ranging session is in response to the first value of the signal strength characteristic being greater than the second value of the signal strength characteristic.

37. The method of claim 29, wherein the combined ranging session includes all UEs that participated in the first ranging session and the second ranging session, including the first UE, the second UE, the third UE, and a plurality of responder UEs.

38. The method of claim 37, the method further comprising:
receiving a second message from the second UE to separate the combined ranging sessions and indicating that the first UE will initiate the ranging sessions in response to the second UE determining that ranging signals broadcast in a plurality of combined ranging sessions is not received by another UE more than a predetermined threshold number of times.

39. The method of claim 29, further comprising sending a capability message indicating availability of combining ranging sessions.

40. The method of claim 29, wherein the first UE, the second UE, and the third UE are each one of a vehicle based UE, a pedestrian based UE, or a roadside unit.

41. A first user equipment (UE) configured for ranging between UEs, the first UE comprising:
a wireless transceiver configured to wirelessly communicate with entities in a wireless network;
at least one memory; and
at least one processor coupled to the wireless transceiver and the at least one memory, wherein the at least one processor is configured to:
send, via the wireless transceiver, an initial message to a second UE to initiate a first ranging session;
receive, via the wireless transceiver, a message from the second UE to combine the first ranging session with a second ranging session initiated by a third UE and indicating that the second UE will initiate a combined ranging session; and
perform the combined ranging session with the second UE.

42. The first UE of claim 41, wherein the second UE determines that the first ranging session and the second ranging session are concurrent before sending the message to combine the first ranging session and the second ranging session.

43. The first UE of claim 41, wherein the second UE determines that the first UE and the third UE have initiated separate ranging sessions more than a predetermined number of times before sending the message to combine the first ranging session and the second ranging session.

44. The first UE of claim 41, wherein the at least one processor is further configured to receive an initial message from the second UE to initiate the combined ranging session.

45. The first UE of claim 44, wherein the at least one processor is further configured to send a response message to the second UE indicating that the second UE will initiate the combined ranging session.

46. The first UE of claim 45, wherein the at least one processor is configured to send the initial message by being configured to broadcast the initial message to the second UE and a fourth UE to initiate the first ranging session, the at least one processor is further configured to:
receive, via the wireless transceiver, a second message from the fourth UE to combine the first ranging session with the second ranging session initiated by the third UE and indicating that the fourth UE will initiate the combined ranging session;

send, via the wireless transceiver, the response message to the second UE indicating that the second UE will initiate the combined ranging session;

receive, via the wireless transceiver, an initial message from the second UE to initiate the combined ranging session;

wherein the combined ranging session includes the second UE, the third UE, and the fourth UE.

47. The first UE of claim 46, wherein the message from the second UE indicates that the second UE will be a positioning anchor and the second message from the fourth UE does not indicates that the fourth UE will be a positioning anchor, and wherein the at least one processor is configured to send the response message to the second UE indicating that the second UE will initiate the combined ranging session is in response to the second UE indicating that the second UE will be a positioning anchor, wherein the combined ranging session comprises a combined positioning session using the second UE as the positioning anchor.

48. The first UE of claim 46, wherein the message from the second UE further indicates a first value of a signal strength characteristic for ranging signals in the first ranging session and the second ranging sessions measured by the second UE and the second message from the fourth UE indicates a second value of the signal strength characteristic for the ranging signals in the first ranging session and the second ranging sessions measured by the fourth UE, and wherein the at least one processor is configured to send the response message to the second UE indicating that the second UE will initiate the combined ranging session is in response to the first value of the signal strength characteristic being greater than the second value of the signal strength characteristic.

49. The first UE of claim 41, wherein the combined ranging session includes all UEs that participated in the first ranging session and the second ranging session, including the first UE, the second UE, the third UE, and a plurality of responder UEs.

50. The first UE of claim 49, wherein the at least one processor is further configured to:

receive, via the wireless transceiver, a second message from the second UE to separate the combined ranging sessions and indicating that the first UE will initiate the ranging sessions in response to the second UE determining that ranging signals broadcast in a plurality of combined ranging sessions is not received by another UE more than a predetermined threshold number of times.

51. The first UE of claim 41, wherein the at least one processor is further configured to send, via the wireless transceiver, a capability message indicating availability of combining ranging sessions.

52. The first UE of claim 41, wherein the first UE, the second UE, and the third UE are each one of a vehicle based UE, a pedestrian based UE, or a roadside unit.

53. A first user equipment (UE) configured for ranging between UEs, the first UE comprising:

means for sending an initial message to a second UE to initiate a first ranging session;

means for receiving a message from the second UE to combine the first ranging session with a second ranging session initiated by a third UE and indicating that the second UE will initiate a combined ranging session; and means for performing the combined ranging session with the second UE.

54. The first UE of claim 53, further comprising means for receiving an initial message from the second UE to initiate the combined ranging session.

55. The first UE of claim 53, wherein the combined ranging session includes all UEs that participated in the first ranging session and the second ranging session, including the first UE, the second UE, the third UE, and a plurality of responder UEs.

\* \* \* \* \*